US012647247B2

(12) United States Patent
Chevallier-Mames et al.

(10) Patent No.: US 12,647,247 B2
(45) Date of Patent: Jun. 2, 2026

(54) COMPUTATIONAL NETWORK ENCODING FOR FULLY HOMOMORPHIC EVALUATION

(71) Applicant: ZAMA SAS, Paris (FR)

(72) Inventors: Benoit Chevallier-Mames, Paris (FR); Pascal Gilbert Yves Paillier, Paris (FR)

(73) Assignee: ZAMA SAS, Paris (FR)

( * ) Notice: Subject to any disclaimer, the term of this patent is extended or adjusted under 35 U.S.C. 154(b) by 19 days.

(21) Appl. No.: 18/565,983

(22) PCT Filed: Jun. 3, 2022

(86) PCT No.: PCT/EP2022/065197
§ 371 (c)(1),
(2) Date: Nov. 30, 2023

(87) PCT Pub. No.: WO2022/254011
PCT Pub. Date: Dec. 8, 2022

(65) Prior Publication Data
US 2024/0364496 A1    Oct. 31, 2024

(30) Foreign Application Priority Data

Jun. 4, 2021    (EP) ..................................... 21290038
Sep. 20, 2021    (EP) ..................................... 21197777

(51) Int. Cl.
*H04L 9/00*      (2022.01)
*G06F 7/544*     (2006.01)
*H04L 9/30*      (2006.01)

(52) U.S. Cl.
CPC ............ *H04L 9/008* (2013.01); *H04L 9/3093* (2013.01); *G06F 7/544* (2013.01); *G06F 2207/4824* (2013.01)

(58) Field of Classification Search
CPC . G06F 2207/4824; G06F 7/544; H04L 9/008; H04L 9/3093
See application file for complete search history.

(56) References Cited

U.S. PATENT DOCUMENTS

2016/0350648 A1    12/2016    Gilad-Bachrach et al.

FOREIGN PATENT DOCUMENTS

| JP | 2019-46460 A | 3/2019 |
| JP | 2020-190614 A | 11/2020 |
| WO | 2019/102624 A1 | 5/2019 |

OTHER PUBLICATIONS

Ilaria Chillotti et al., "TFHE: Fast Fully Homomorphic Encryption Over the Torus*", Journal of Cryptology, vol. 33, 2020, pp. 34-91.
(Continued)

*Primary Examiner* — Terrell S Johnson
(74) *Attorney, Agent, or Firm* — NIXON & VANDERHYE P.C.

(57) ABSTRACT

Some embodiments are directed to a computer-implemented method to convert a first computation network of operations into a second computation network of operations. The operations of the second computation network being fully homomorphic encrypted (FHE) operations. The converting may include obtaining for the input values of the operation a supported range of the input value in the first computation network, and determining a prescribed range for the input values of a corresponding FHE operation.

22 Claims, 7 Drawing Sheets

(56)          References Cited

OTHER PUBLICATIONS

Christian Szegedy et al., "Going Deeper with Convolutions", 2015 IEEE Conference on Computer Vision and Pattern Recognition (CVPR), Jun. 7-12, 2015, 9 pages.

Craig Gentry, "Fully Homomorphic Encryption Using Ideal Lattices", STOC '09: Proceedings of the forty-first annual ACM symposium on Theory of computing, May 31, 2009, pp. 169-178.

Florian Bourse et al., "Fast Homomorphic Evaluation of Deep Discretized Neural Networks", 38th Annual International Cryptology Conference, Santa Barbara, CA, USA, Aug. 19-23, 2018, Proceedings, Part III, 30 pages.

Ilaria Chillotti et al., "Programmable Bootstrapping Enables Efficient Homomorphic Inference of Deep Neural Networks", Lecture Notes in Computer Science (LNCS), vol. 12716, Jul. 1, 2021, 18 pages.

Miran Kim et al., "HEAR: Human Action Recognition via Neural Networks on Homomorphically Encrypted Data", Apr. 19, 2021, 14 pages, arXiv:2104.09164.

Gavril Ognjanovski, "Everything you need to know about Neural Networks and Backpropagation—Machine Learning Easy and Fun", Toward Data Science, Jan. 14, 2019, 25 pages, at URL: https://towardsdatascience.com/everything-you-need-to-know-about-neural-networks-and-backpropagation-machine-learning-made-easy-e5285bc2be3a.

International Search Report and Written Opinion for PCT/EP2022/065197, mailed Sep. 15, 2022, 17 pages.

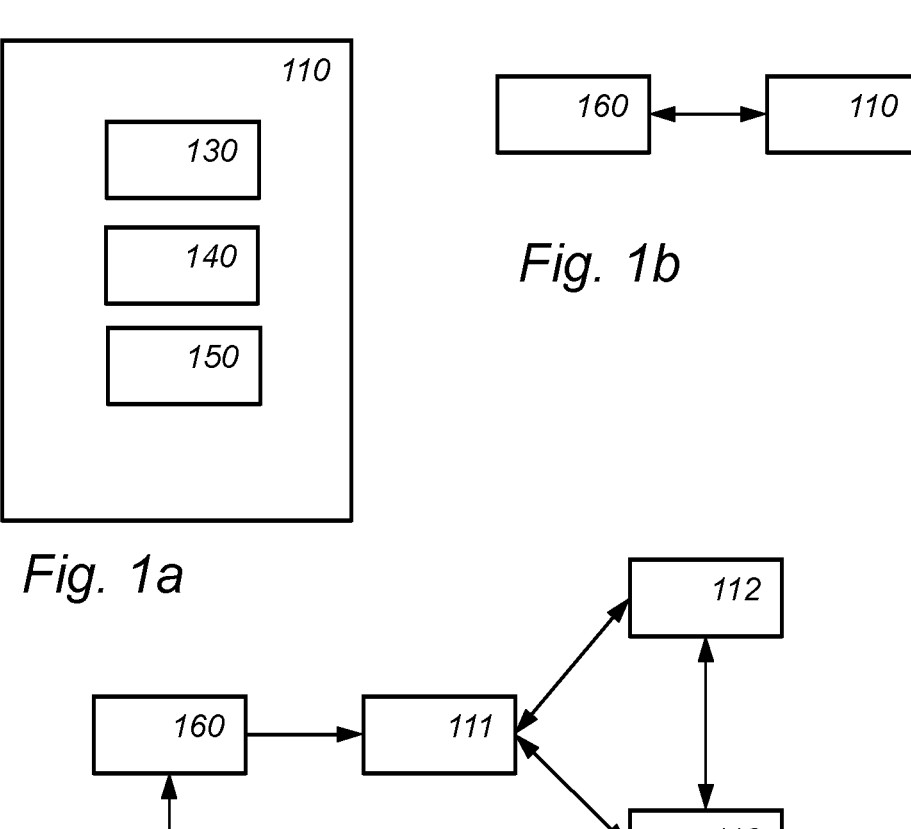
*Fig. 1a*
*Fig. 1b*
*Fig. 1c*
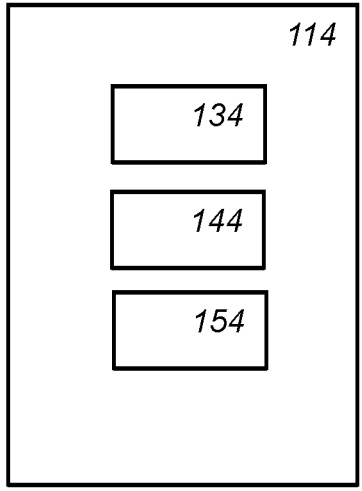
*Fig. 1d*

COMPUTATIONAL NETWORK ENCODING FOR FULLY HOMOMORPHIC EVALUATION

CROSS-REFERENCE TO RELATED APPLICATIONS

This application is the U.S. national phase of International Application No. PCT/EP2022/065197 filed Jun. 3, 2022, which designated the U.S. and claims priority to EP 21197777.2 filed Sep. 20, 2021, and EP 21290038.5 filed Jun. 4, 2021, the entire contents of each of which are hereby incorporated by reference.

TECHNICAL FIELD

The presently disclosed subject matter relates to a method to convert a first computation network of operations into a second computation network of FHE operations, a computer readable medium, and a system for converting a first computation network of operations into a second computation network of operations.

BACKGROUND

Ever since Craig Gentry's breakthrough paper "Fully Homomorphic Encryption Using Ideal Lattices" (Full version in Commun. ACM 53 (3): 97-105, 2010; included herein by reference) there has been a continued effort to make Fully Homomorphic Encryption (FHE) sufficiently secure and efficient for real-world applications. An FHE allows one to perform computations, e.g., evaluate circuits, over encrypted data without being able to decrypt. For example, input data and computation result may be received and returned in encrypted form. Intermediate data, e.g., an internal state of the computation, may also be in encrypted form.

Even though the result of the computation is returned in an encrypted form, when decrypted the output is the same as if the operations had been performed on the unencrypted data. Homomorphic encryption can be used for privacy-preserving outsourced storage and computation. This allows data to be encrypted and outsourced to a cloud environment for processing and/or storage, all while encrypted.

For example, homomorphic cryptography may be applied in fields such as health care in which privacy regulations may make it difficult to share plain data, but computations on encrypted medical data may be allowable. For example, a medical model developed, say, to classify medical data may be configured to receive medical data from a third party, say a hospital, in encrypted form. The medical model might, e.g., classify medical data, e.g., as normal or abnormal, or as having some particular medical syndrome, disease, or other disorder. Using homomorphic encryption, the medical model may be applied to medical data that is received in encrypted form. This means that the party that evaluates the medical model does not have access to the plain medical data that corresponds to the encrypted medical data. The user of the service can decrypt the result of the medical model application.

A cryptosystem that supports arbitrary computations on ciphertexts is known as a fully homomorphic encryption (FHE) scheme. Such a scheme enables the evaluation of a wide range of functions, and which can be run on encrypted inputs to produce an encryption of the result. For example, so-called functional completeness can be obtained once a combination of and-gates and or-gates are available as this allows one to implement any Boolean circuit. Such a circuit can be run by an untrusted party without revealing its inputs and internal state and output. A fully homomorphic encryption may be leveled, in which case the number of certain operations cannot exceed a predetermined threshold. A leveled fully homomorphic scheme may be converted to an unleveled FHE scheme by performing bootstrapping operations. A bootstrapping operation increases the number of operations than can be performed on an encrypted data item.

A fully homomorphic encryption scheme may support computations expressed in some special form, e.g., as a Boolean or arithmetic circuit. For example, a leveled fully homomorphic encryption scheme may support the evaluation of arbitrary circuits but of a bounded, pre-determined, depth. Unleveled fully homomorphic encryption (FHE) allows the evaluation of arbitrary circuits of unbounded depth. A leveled FHE scheme may be converted to an unleveled FHE scheme by periodic execution of a bootstrapping operation on data. It is known how to compile a computation, e.g., a function, in the form of a circuit.

Since Gentry's paper many FHE schemes have been developed, bringing computation times down with multiple orders of magnitude. Now, many FHE schemes are known. A more recent example of an FHE scheme is described in the paper "TFHE: Fast Fully Homomorphic Encryption over the Torus" by Ilaria Chillotti, et al. (J. Cryptology 33 (1): 34-91, 2020), included herein by reference.

A preferred FHE scheme is described in the paper "Programmable Bootstrapping Enables Efficient Homomorphic Inference of Deep Neural Networks" by Ilaria Chillotti, Marc Joye and Pascal Paillier, see Cryptology ePrint Archive: Report 2021/091, which is included herein by reference. This paper operates on elements of a torus, e.g., it is a torus type FHE scheme (TFHE).

As efficient FHE schemes become increasingly available, there is an increased interest in converting computations that were initially developed for conventional non-encrypted evaluation into a computation using FHE. Such a conversion is always possible, especially with the advance of the so-called programmable bootstrapping (PBS), a bootstrapping operation that also executes a pre-determined function that can be chosen by the designer of the FHE computation.

A complication when running a first computational network that was originally designed for conventional arithmetic with FHE operations, is that values encrypted according to the FHE scheme can be subject to limitations. In particular, many FHE schemes, in particular TFHE schemes, impose the restriction that values can only occur in a predetermined range.

The cryptographic scheme TFHE uses a mathematical structure called the Torus. An example of a torus is $\mathbb{R}/\mathbb{Z}$, e.g., the real numbers modulo 1 (other moduli are possible, but 1 is convenient). Values on the torus are often represented in practical implementations as a suitable finite ring, e.g., $\mathbb{Z}/m\mathbb{Z}$, where m is a modulus, e.g., the integers modulo a modulus. The integer modulus is typically a power of 2, e.g., $2^q$, where q might be, e.g., 32 or 64, and is generally less than or equal to 128. Encryption of a torus value may be done as in the particular scheme; e.g., as in the above quoted paper "Programmable Bootstrapping Enables Efficient Homomorphic Inference of Deep Neural Networks".

The numbers modulo the modulus represent the values on the torus, e.g., a range from 0 (included) to 1 (excluded). Some FHE operations may impose an even smaller range on their input(s), e.g., from 0 to $\frac{1}{2}$ or even from 0 to $\frac{1}{4}$. Since values occurring in the conventional first computational network are often outside the range supported by the FHE, e.g., outside the range from 0 to 1, there is a need to encode values in the first computational network as smaller values that do fit in the range. Only some of the values of the first computational network need to be encoded: clearly, confidential data is to be encrypted and is encoded first, but also, for example, constants that may be added or subtracted to intermediate encrypted values. In the latter case, the encryption may be the trivial encryption if the data to be added or subtracted is not confidential, e.g., parameters of the model. A notable example of a value which does not need to be encoded is the case of a non-confidential integer constant, by which an intermediate encrypted value is multiplied.

A traditional approach to achieve this is to scale all values in the first computation network down until all values fit into the smallest range supported by the FHE scheme. One particular drawback with this approach is that, even if such scaling down is possible for the particular first computational network, it will incur a loss of accuracy. This in turn will either lead to a degrading of the fidelity of the network when run using FHE operations, or huge crypto parameters will have to be taken in the second computational network to counteract this accuracy loss. The latter option would in turn lead to an increased memory use and slower computation speed.

There is thus a need to better convert first computational networks for execution using FHE operations.

SUMMARY

There is a desire to run computational networks, say a first computational network, not necessarily restricted to neural networks, that are based on conventional arithmetical operations, on encrypted data using FHE operations in a second computational network. To improve the efficiency of such a converted computational network, e.g., a second computational network, it is desirable if operations run directly on encrypted values, without, e.g., requiring the use of a programmable bootstrapping. In particular, accepting that encoding conventional values in the FHE need not be lossless lead to an immediate efficiency gain, as FHE can require very large parameters if complete lossless execution is required. However, if one is to do so, it is preferable that a good encoding is chosen, which makes the most of the existing capacity.

In an embodiment the first computational network operates on input represented as real numbers, e.g., floating-point numbers or fixed-point numbers. Such real numbers can be converted to real number on the torus, and in turn to TFHE encoded values. These types of inputs are of particular relevance for many practical applications, e.g., neural networks and the like. The first computation network could also have integer valued inputs, which can likewise be converted to points on the torus; for example, they could be converted to real numbers.

In an embodiment, the first and second computation networks are neural networks, e.g., deep neural networks. In an embodiment, the first and second computation networks are arranged to receive an input image. In an embodiment, the first and second computation networks are neural networks arranged to receive an input image. The input image may be a medical input image although this is not necessary. The second computational network preferably computes the same function as the first computational network, although for most applications it might be possible that the second computational network computes a function which is approximated. Even a close approximation is preferred to full fidelity for performance. For example, whether the second computational network computes a function on an image, e.g., an image classification, or a control signal for a machine, or the like, it is often sufficient if the output of the second computational network is close to the output of the first computational network, or close to a reference output.

In an embodiment, a first computation network of operations is obtained for conversion. It assumed that the first computation network already avoids multiplications of encrypted values by real numbers. Such multiplications are not forbidden per se, as they can be implemented as a programmable bootstrapping (PBS), but a PBS is much more expensive than operations that can be performed natively, such as addition or multiplication by integers. The operations in the first computational network are assumed then to comprise matrix operations, e.g., a computation of the form y=Wx+B where the matrix multiplication part, e.g., Wx, uses an integral matrix, that is a matrix having only integers as components. This is a reasonable assumption, as non-integer matrices can be converted to integer matrices by rounding them, possibly at some accuracy loss, or by first multiplying them with an expansion factor, and then rounding them. In the latter case other operations may need adjustment, e.g., the matrix addition part may also be multiplied with the expansion factor, although rounding is not needed, as additions can be done natively even with real-valued numbers. Operations that follow the matrix operation may be adjusted to expect input values that are a factor too large. Such an adjustment can be made by composing the following operation with a division by the expansion factor. Alternatively, e.g., if the first computation network is a neural network, one could use a training that keeps the values in the matrix multiplication integer-valued.

In addition to matrix operations with an integer matrix, the first computation matrix may also comprise other operations, e.g., further operations, e.g., an activation function such as, z=A(y).

Once the first computation network is obtained, e.g., received, it can be converted into a second computation network which can be computed on encrypted values, using FHE operations. In principle, operations in the first computation network can be converted one to one, although it is sometimes advantageous to insert additional operations in the second computational network, as explained herein. Particularly advantageous FHE schemes are those on the torus, as they allow efficient programmable bootstrapping in addition to native addition and integer multiplication.

Elements in the FHE scheme may have a restricted range, this is in particular true for the torus, which can be thought of as the set of real numbers modulo an integer, typically modulo one. As values in the first computational network, e.g., input values, intermediate values or output values may well lie outside that range, an encoding is needed from values in the first computational network to the second computational network. Note the encoding can be implicit in the second computational network; the encodings may be used to set the parameters of the operations in the second computational network, but the encodings are not explicitly needed, say, to execute the second computation network. The only exception being the encoding of input values and the decoding of output values, where the encoding may be explicitly used in addition to the encryption or decryption steps (e.g., input being first encoded then encrypted, while output is first decrypted then decoded).

To convert an operation in the first network to an FHE operation in the second network, one can obtain the range that will be supported for a particular value, e.g., variable, neuron output, or point in the network, that occurs in the first network. For example, one can observe the values that actually occur at the particular point in the first computation network, and derive form that the supported range. The observed range may for example be the range from the lowest to the highest observed value. The supported range may be the same, or advantageously the supported range may extend the observed range by a margin, e.g., a multiplicative margin, e.g., 5% or 20% larger. The supported range may extend the observed range at both sides of the range.

Different layers in the second computational network may have different prescribed ranges, e.g., the range that values need to stay in to ensure correct processing, e.g., due to technicalities of the FHE scheme used, or the particular operation, or the number of operands in an operation, etc. For example, in TFHE the prescribed range for most matrix operations may have size 1, e.g., the prescribed range may be from 0 to 1, whereas a PBS that needs padding bit may require a range from 0 to ½, whereas a PBS that does not require a padding bit, e.g., a negacylic operation, may use a range from 0 to 1, whereas a PBS that uses multiple operands, may need more padding, e.g., use a range from 0 to ¼, e.g., for a MaxPool, etc. Determining the prescribed range for an operation may be implemented as a look-up table. For example, a look-up table may map an operation in the first computational network to an FHE operation, and also provide the prescribed range, etc.

A scaling factor may be determined such that applying the scaling factor to the supported range for a value maps it to a range having the size of the prescribed range. For example, a scaling factor may be applied to a value in the supported range by multiplying the value with the scaling factor. An encoding may also comprise a shift which is added to the scaled value.

Remark that sometimes, we speak about the encoding divisor d, which is the inverse of the scaling factor a, thus $a=1/d$ or reversely $d=1/a$.

Note, that often many values are preferably assigned the same scaling factor. It is not impossible to keep track of individual scaling factors for each value, but in practice, all values in a layer, and in fact often all values in multiple layers may be assigned the same scaling factor. Matrix operations are easier to do with equal scaling factors. As this occurs frequently, there is only a modest gain to track individual per-value scaling factors. In an embodiment, multiple values will be assigned the same scaling factor, e.g., the values in one or multiple layers, e.g., one or multiple sets of input values of one or multiple operations. The scaling factor to use is typically determined by just one particular value and operation, among the multiple values and operations that will be assigned the same scaling factor. The one particular value and operating that needs the smallest scaling factor, sets the scaling factor for the rest of the multiple values that are assigned the same scaling factor.

Having the scaling factor, the operations that will receive the scaled value can be adjusted to receive the input values scaled with the scaling factor. An operation may be adjusted to expect input values that are too large by a factor. To fully specify an encoding, e.g., a linear mapping such as $ax+b$, one needs a shift b in addition to the scaling factor a.

It was an insight of the inventors that for matrix operations one can ignore the shift part of the encoding to adjust the matrix operation. The matrix operation will change the shifts, but otherwise the operation will remain correct. This does not hold up for a PBS operation were shifts have to be taken into account. A PBS may therefore be adjusted both for the scaling factor and the shift factor. The shift can be applied before a PBS to shift the values into the prescribed range, by inserting an addition before the shift.

However, such shift operations can often be combined with a previous operations though, e.g., if the previous operation also comprises an addition, e.g., in a matrix operation, in which case inserting an addition is no longer needed: one just modifies the previous operation to take into account the shift. For example, if $y=Wx+b$ and $z=PBS(y)$, one could modify this to: $y=Wx+b$, $y'=y+shift$ and $z=PBS(y')$ but one can combine these 3 steps into 2 steps, by doing $y=Wx+b'$ and $z=PBS(y')$, where the modified bias b' is taken equal to $b+shift$.

The shift factor can be determined by applying the scaling factor to a supported range before the operation, and shifting the scaled supported range to fall in the prescribed range. For example, if the supported range is $[-30, 20]$, the scaling factor is 0.01, and our prescribed range is $[0, ½]$, then the scaled supported range becomes $[-0.3, 0.2]$. One can apply a shift of 0.3 to get a range of $[0, ½]$. If the prescribed range is larger than the scaled supported range, there are multiple choices for the shift factor. For example, if the supported range is $[-25, 20]$, the scaling factor is 0.01, and our prescribed range is $[0, ½]$, then the scaled supported range becomes $[-0.25, 0.2]$. One can then apply any shift between 0.25 and 0.3 to get a range included in $[0, ½]$.

For example, a matrix operation such as $Wx+B$ may be adjusted by adjusting the matrix addition also referred to as the bias, $B'=B/d_1$ but not the matrix multiplication, also referred to as the weight matrix W. Then, the operation $Wx+B'$ in the second computational network will receive inputs which are encoded with an encoding divisor $d_1$ and outputs will be with the same encoding divisor $d_1$. For example, a further operation $A(x)$ may be adjusted to receive the input values scaled with the scaling factor and shifted with a shift value $A(d_1x-s_1)$. In this case, it may be that the further operation operates individually on values in a layer, so that the shift $s_1$ may be different for different values. Although, not necessary, it is often arranged that the scaling factor $d_1$ is the same for all values in the layer on which operation A acts.

Although not necessary, one can incorporate an encoding at the output of a PBS, e.g., further adjusting a further operation $A(x)$. $A(x)$ is further adjusted to produce an output value scaled with a further scaling function for a next operation, e.g., this may be $A(\ )/d_2$ or $A(\ )/d_2+s_2$, together with the first encoding this may become $A(d_1x-s_1)/d_2+s_2$. These additional encodings increase the number of independent encodings, thus decreasing the number of values or layers that are assigned the same scaling factor. This in turn means that choices for the encoding values can better suit the particular supported ranges occurring in the layers, instead of using a less optimal scaling factor induced by a supported range from a different layer.

For example, scaling factors may be found by first assigning symbolic scaling factors to layers between operations, and to reduce the number of symbolic scaling factors based on conditions placed on them imposed by the first network architecture or topology. For example, the number of symbolic scaling factors may be reduced by setting some of them equal to one another. In particular, so-called join layers or join operations discussed herein, can impose such conditions. A Join layer is defined as a layer which uses the result of two or more previously-computed layers. Actual values can then be assigned to each symbolic scaling factors by determining the smallest scaling factor that will still fit each supported range for the values occurring in the layers to which the scaling factor will be applied. For example, one can compute a scaling factor for each value in those layers, and take the smallest one, or equivalently the largest encoding divisor.

In an embodiment, values in a layer may have a supported range that is smaller after applying the scaling factor than the size of the prescribed range. This can happen naturally, for example if the scaling factor is smaller to account for the supported range of another value. It can also be enforced by taking the scaling factor intentionally too small, i.e., smaller than required; e.g., by decreasing the size of the prescribed range. This means that scaled supported range will fit loosely in a prescribed range, so to say. That is the scaled range can be shifted into the prescribed range using multiple different shifts, as described earlier. As noted herein, some operations, like a PBS, may need a shift to ensure that the values that it operates on are in the range expected by the operation. Other operations, e.g., a multi-sum, do not need this. When one needs to use a shift, we need adjustment in second computational network, e.g., by insert an addition by the shift or by modifying the previous operation. The encoding, and thus the shift in it represents how a value in the first network translates to a value in the second network. Changing the shift in an encoding may be done by modifying a previous operation, e.g., the bias of a previous matrix operation, e.g., a Gemm operation, or by inserting a new Add operation that adds a chosen shift. For example, in an embodiment, an Add operation may be inserted; after making the second network functionally complete, an optimizer can be applied, which may then merge operations, e.g., two subsequent linear operations, e.g., a matrix operation and an inserted Add operation. If the previous operation is a PBS, a shift can be incorporate in its output encoding. Applying a new shift s may be a difference between a current shift $s_1$ and a desired shift $s_2$, e.g., $s=s_2-s_1$.

When implementing a further operation as a PBS, one would ordinarily compute as many test-vectors (which are arrays used during the PBS that encode the input output behavior of the PBS), as there are shifts, which might well be equal to the number of values in the input layer. For two values for which the possible shifts overlap, e.g., there is at least one shift that works for both values, a single test vector may be used, which has the advantage to make the computation of the test vectors faster, to reduce the memory used during the execution of the second network, or to reduce the storage of the second network, to name a few. This can be done more systematically by grouping the programmable bootstrapping operations according to the individual shift of the input values, and by assigning one test vector to each group. This can significantly reduce the number of required test vectors and thus shrink the size of the second computational network. The number of performed PBS is maintained equal, and so is the second-network execution time.

A particularly useful application of conversion is allowing the execution of computation on private data. For example, a computation such as a medical evaluation of an image or other medical data.

Medical data may comprise a medical image. A medical image may comprise, e.g., multi-dimensional image data, e.g., to two-dimensional (2D), three-dimensional (3D) or four-dimensional (4D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

A further aspect is an electronic system or device, e.g., a computer, configured for conversion according to an embodiment, e.g., a system for converting a first computation network of operations into a second computation network of operations.

BRIEF DESCRIPTION OF DRAWINGS

Further details, aspects, and embodiments will be described, by way of example only, with reference to the drawings. Elements in the figures are illustrated for simplicity and clarity and have not necessarily been drawn to scale. In the figures, elements which correspond to elements already described may have the same reference numerals. In the drawings, FIG. 1*a* schematically shows an example of an embodiment of a system for performing a computation using fully homomorphic encryption (FHE), FIG. 1*b* schematically shows an example of an embodiment of a system for performing a computation using FHE, FIG. 1*c* schematically shows an example of an embodiment of a system for performing a computation using FHE, FIG. 1*d* schematically shows an example of an embodiment of a system for converting a first computation network into a second computation network for FHE operators, FIG. 2 schematically shows an example of an embodiment of a converting system, FIG. 3 schematically shows an example of an embodiment of a first computation network, FIG. 4*a* schematically shows an example of an embodiment of a first computation network, FIG. 4*b* schematically shows an example of an embodiment of a first computation network, FIG. 5*a* schematically shows an example of an embodiment of a first computation network, FIG. 5*b* schematically shows an example of an embodiment of a first computation network, FIG. 6 schematically shows an example of an embodiment of a converting method, FIG. 7*a* schematically shows examples of a computer readable medium having a writable part comprising a computer program according to an embodiment, FIG. 7*b* schematically shows a representation of a processor system according to an embodiment.

REFERENCE SIGNS LIST

Figure 2:
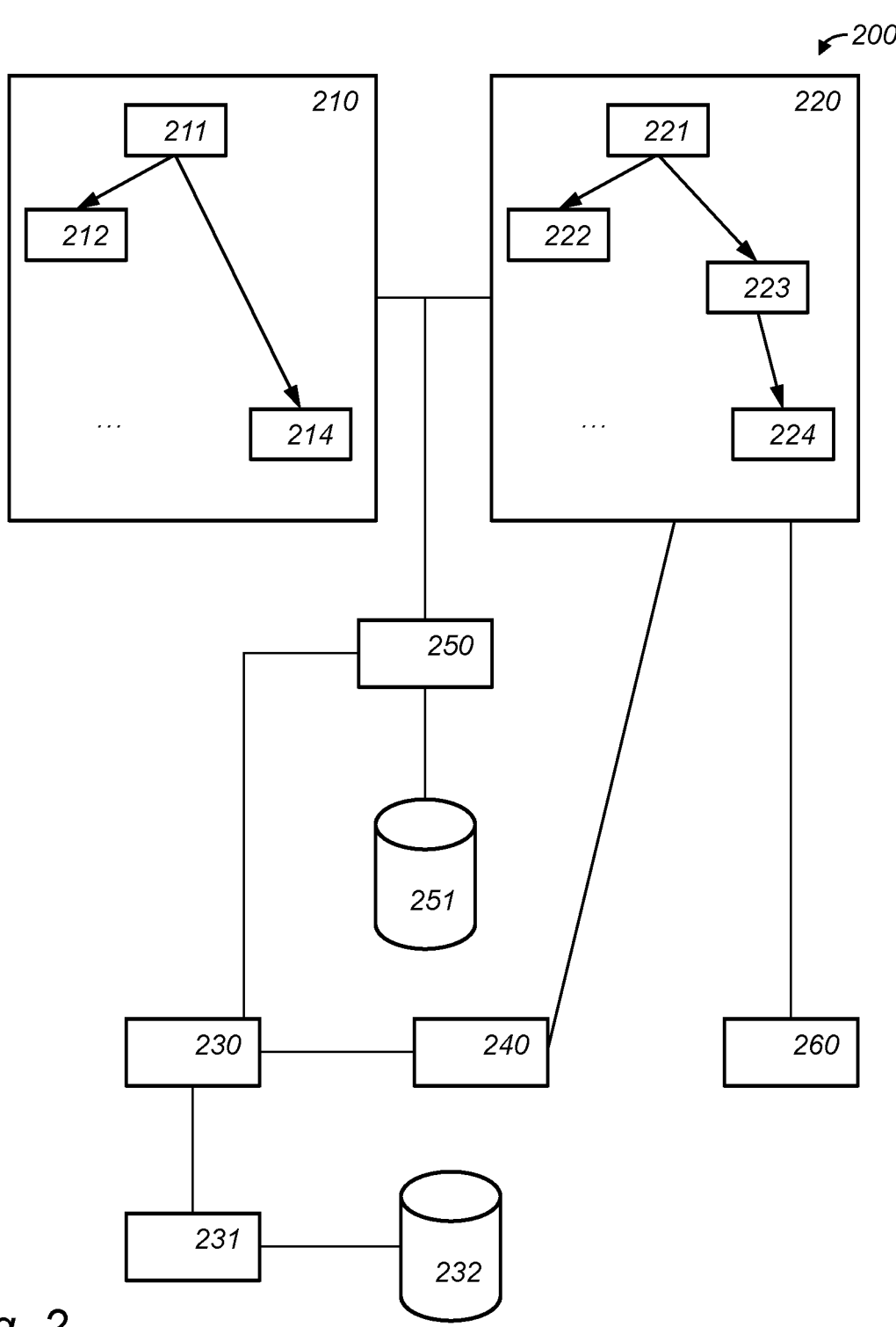

The following list of references and abbreviations is provided for facilitating the interpretation of the drawings and shall not be construed as limiting the claims. The list refers to FIGS. 1*a*-5*b* and 7*a*-7*b*.

1-99 a layer
110 an FHE computing system
111-113 an FHE computing system
114 a converting system 130, 134 a processor system
140, 144 a storage
150, 154 a communication interface
160 a data provider system
200 a converting system
210 a first computation network
220 a second computation network
211-214 an operation
221-224 an operation
230 scaling factor unit
231 range unit
232 a sample storage
240 a converting unit
250 an accuracy unit
251 a sample storage
260 a grouping unit
300 a first computation network
410 a first computation network
411 an input
412-414 an operation
415 an output
420 a first computation network
421 a fork operation
422 a join operation
510 a first computation network
511 a fork operation
512 a join operation
520 a first computational network
525 a conversion operation
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DESCRIPTION OF EMBODIMENTS

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them.

Further, the subject matter that is presently disclosed is not limited to the embodiments only, but also includes every other combination of features described herein or recited in mutually different dependent claims.

FIG. 1a schematically shows an example of an embodiment of an FHE computing system 110, e.g., a system for performing a computation using fully homomorphic encryption (FHE). For example, the system 110 of FIG. 1a may be used to perform a computation on data, even though said data is received in encrypted form, e.g., from a data provider.

System 110 may comprise a processor system 130, a storage 140, and a communication interface 150. Storage 140 may comprise local storage, e.g., a local hard drive or electronic memory. Storage 140 may comprise non-local storage, e.g., cloud storage. In the latter case, storage 140 may comprise a storage interface to the non-local storage. For example, storage 140 may store encrypted data items, e.g., received from one or more data providers or generated as intermediate results or end results, e.g., outputs, of the computation. Typically, most or all data items on which the computation of system 110 is performed are encrypted with a key (or keys) that is not known to system 110—that is system 110 may not be configured to obtain the plain data items corresponding to the encrypted data items, e.g., such as stored in storage 140. The decryption key in plain form is secret for system 110, though the encryption/decryption key may be available in encrypted form. For example, the processor system may be configured to perform a sequence of FHE operations, which may include such arithmetic operations on encrypted values as addition and multiplication, but may also include arithmetic operations on encrypted polynomials.

Performing a computation using FHE operations may be done by stringing a series of FHE operations after one another, some of which may operate on input values, other may operate on intermediate values. Typically, most or all the operations are done on encrypted values, so that the FHE system does not know the confidential values that it is working on.

One source of FHE computations is to start from a regular computation, e.g., a sequence of non-FHE operations and to convert the conventional computation into an FHE computation. A particular suitable source of computations that can be converted are so-called computation networks, also called computational networks. In a computation network, the nodes represent operations and the edges in the network indicate which operations take values from other operations as input.

In an embodiment, a computation network may be represented as a directed, cycle-free graph, in which nodes represent operations and directed edges indicate which operations take input from which previous operations. For example, the computation network may be represented in the form of a text file, e.g., as a sequence of operators. A computation network may also be represented as a connection table, together with information indicating the type of the operators.

Input nodes in the computation network may represent external output, while output nodes may represent output values. This concept of computation network can be expanded while still being amenable to conversion by an embodiment. For example, although in an embodiment, the computation network does not contain conditional jumps, conditional assignment may be allowed, as this can be represented as an FHE operation. More precisely, a conditional assignment may be represented as y=c?a: b, which sets y=a if c is True, or y=b if c is False, and is doable in FHE by replacing the operation by the equivalent operation y=c*(a−b)+b, where c is restricted to an encrypted bit 0 or 1. The computation network might also not contain loops, e.g., may be cycle free, but this is also not necessary as loops having a fixed number of iterations can be accommodated in an FHE network as well, e.g., by unrolling the loop. Even loops with a dynamically determined number of iterations may be converted if there is an upper bound on the number of cycles in the loop; in the latter case the dynamic loop may first be converted to a loop with a fixed number of iterations.

FIG. 1d schematically shows an example of an embodiment of a system 114 for converting a computation for FHE.

System 114 may be configured to convert a first computation network of operations arranged to compute a function into a second computation network of FHE operations arranged to compute the same function. Like system 110, system 114 comprises a processor system 134, a storage 144, and a communication interface 154. In fact, system 110 and 114 may be the same system, this is not necessary though. For example, system 114 may receive a representation of a first computation network and convert it into a second computation network for FHE execution. For example, system 114 may receive the first computation network from a third party, e.g., from data provider system 160 or the like. Alternatively, the first computation network may originate elsewhere, for example, a conventional compiler may receive a high-level description of the desired computation and produce the first computation network, e.g., even multiple first computation networks each for some aspect of the computation that together perform the overall computation. Once converted, the second computation network may be transferred to system 110 for computation. If systems 110 and 114 are the same then the second computation network may be executed on the same system. For example, system 114 may be provided by the same party that provides computation system 110. Alternatively, a user of system 110 may install a system 114 on its own premises, e.g., by downloading appropriate software and using that to convert his computation networks which in turn may be uploaded to system 110 for execution.

System 110 and system 114 may communicate internally, with each other, with other systems, external storage, input devices, output devices, and/or one or more sensors over a computer network. The computer network may be an internet, an intranet, a LAN, a WLAN, etc. The computer network may be the Internet. The system comprises a connection interface which is arranged to communicate within the system or outside the system as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna. Communication, e.g., internal communication, may use other communication protocols or media, e.g., an internal data bus.

In system 110 and system 114, the communication interfaces 150 and 154 may be used to send and/or receive digital data. For example, system 110 may be configured to receive encrypted data items from an external computer, e.g., a data providing computer. For example, system 110 may be configured to transmit computation results to an external computer, typically, in an encrypted format. For example, communication interface 150 may be used for internal communication in system 110, e.g., to distribute the computation of multiple computation entities, e.g., computing devices. For example, system 114 may be configured to receive a first computation network and/or to transmit a converted second computation network.

The execution of systems 110 and/or 114 may be implemented in a processor system, e.g., one or more processor circuits, e.g., microprocessors, examples of which are shown herein. Systems 110 and/or 114 may comprise multiple processors, which may be distributed over different locations. For example, systems 110 and/or 114 may use cloud computing.

Some of the figures herein show functional units that may be functional units of the processor system. For example, a figure may be used as a blueprint of a possible functional organization of the processor system. The processor circuit(s) are not shown separate from the units in most figures. For example, the functional units shown in FIG. 2 (see below) may be wholly or partially implemented in computer instructions that are stored at a system such as systems 110 and/or 114, e.g., in an electronic memory of the system, and are executable by a microprocessor of the system. In hybrid embodiments, functional units are implemented partially in hardware, e.g., as coprocessors, e.g., arithmetic and/or cryptographic coprocessors, and partially in software stored and executed on systems 110 and/or 114.

FIG. 1b schematically shows an example of an embodiment of a system for performing a computation using FHE. FIG. 1b shows the FHE system of FIG. 1a in the context of a data provider system 160. FHE system 110 is configured for performing a computation using fully homomorphic encryption (FHE) cryptography.

For example, system 110 may be configured to receive encrypted data items from a data provider 160. At least some data items may be received in encrypted form. Some data items may be received in plain format. The computation is run on the received data items and possibly also on stored data items. Interestingly, the computation may be performed on the encrypted data, without decrypting the data, e.g., without converting encrypted data items to data in a plain format.

System 110 may be configured for an FHE scheme, e.g., for a number of FHE operations. FHE operation may include gates. For example, an FHE system may be configured for a so-called NAND-gate. For example, an FHE system may have an addition and a multiplication operation, e.g., in a finite field, or finite ring, or the like. The operations of the FHE scheme are in principle sufficient to perform a wide range of computations, with the exception that the number of consecutive operations may be limited, e.g., if the FHE scheme is a leveled scheme without a bootstrapping operation, or without a bootstrapping operation being employed.

Typically, encrypted data in an FHE scheme and as implemented in an FHE system, involves some measure of noise. For example, encryption of a data item may comprise mapping the data item to a point in a key-dependent lattice, to which some noise is added.

When a data item has just been encrypted the noise is low—the encryption is fresh. For example, the amount of noise is so low, that if a data item were to be decrypted, the noise can be removed at some point in the decryption process, e.g., by rounding. On the other hand, the noise should be high enough to make attacks on the system sufficiently hard. For example, in the hypothetical absence of noise, many FHE schemes could be attacked with linear algebra, or other efficient algorithms, e.g., lattice-based algorithms. When a data item is encrypted, noise is added that is chosen so that attacks are hard while FHE operations can still be performed. Most FHE operations will increase the noise that is inherent in an encrypted FHE data item. When many such operations are performed, the noise will reach a level such that correct decryption is no longer possible. At that point, the scheme breaks down. Generally speaking, two approaches have been developed in the art to deal with this phenomenon. The first is the leveled FHE approach. A leveled FHE scheme can perform some limited number of operations, one after the other. The leveled FHE scheme is designed such that the worst-case noise at the end of such a number of operations is below a bound needed for decryption. Another approach are so-called bootstrapping operations. A bootstrapping operation reduces noise in an encrypted data item, by returning a fresh encryption of the same data with less noise. A bootstrapping operation is notably possible if the FHE scheme is capable enough to evaluate homomorphically its decryption algorithm in the encrypted domain—sometimes called a bootstrappable FHE scheme. For example, a bootstrapping operation receives helper data related to the encryption key that allows reducing the noise without decryption of the encrypted data items. Typically, the helper data is an encrypted version of the key used to decrypt the data item. Note that the decryption key may be the same as the encryption key, in case of a symmetric-key FHE scheme, or may be distinct therefrom, e.g., in case of an asymmetric-key FHE scheme. In addition to encryption and decryption keys, an FHE scheme may use other keys, such as a key for homomorphic evaluation. The latter is typically a public key corresponding to a private key which may be stored at the data provider.

Although the bootstrapping operation performs the decryption of an encrypted data item, counterintuitively the decryption is performed in the encrypted domain, so that the homomorphic decryption does not actually reveal anything about the plain data item. The bootstrapping operation then performs the noise reduction-typically by homomorphic rounding. The result is an encrypted data item, with a lower, fixed noise level. Typically, the noise present in the ciphertext resulting from bootstrapping results from the bootstrapping operation.

After the bootstrapping, a new sequence of FHE operations can be performed until the noise level becomes so high, that a new bootstrapping operation is needed.

Determining when a bootstrapping is needed can be done by keeping track how large the noise level will be, e.g., assuming a worst-case scenario. Instead of a worst-case scenario, an average-case may be assumed, although this may increase the risk of a computation result which cannot be decrypted. For example, a computation that is inherently robust against occasional errors, such as a neural network evaluation, may be performed using average-case analysis for the noise propagation.

The noise analysis, e.g., worst-case or average-case analysis, may be done beforehand, but may also be done dynamically. The noise-increase may depend on the particular computation. For example, an FHE scalar multiplication increases noise by an amount that depends on the multiplicand. One approach is to perform a bootstrapping operation often, e.g., after every operation, or after every set number of operations, e.g., every two. Particularly useful are programmable bootstrapping operations which can reduce noise in addition to computing a function. For example, the function can be an encoded as a lookup table, this table being called the test-vector of the programmable bootstrapping.

FHE schemes can be applied in many settings. For example, FHE system 110 may be operated by a cloud provider. The cloud provider may offer computation and storage services to its clients. By employing FHE encryption, data provider 160, e.g., a client of the cloud provider can send their data in encrypted form. The cloud provider can still perform the required computations, and/or the required storage, but will not be able to know the corresponding to plain data nor the result of the computation. For example, data provider 160 may use an encryption key of a type corresponding to the particular FHE scheme used in the FHE system, to encrypt the data items. When computations results are received by data provider 160 from FHE system 110, a corresponding decryption key may be used to decrypt the encrypted data items. Encryption and decryption keys may be the same—and typically are so.

For example, a training system, possibly system 160, may be configured to train machine-learning models, e.g., image classifiers, e.g., medical models, typically while having access to the plain data items. For example, backpropagation may be performed on the input data. The resulting model parameters may be processed by an embodiment for running on encrypted data.

After the model is trained, the FHE system 110 may be used to offer the model, FHE system 110 may be used to offer the model, say, for use with medical data. This is typically done with plain model parameters, but with encrypted data, e.g., encrypted input, intermediate and output data. An effect of the system is that a computation is performed, say an image classification, e.g., a medical image classification, without the computer knowing the plain data items. For example, a mammogram may be evaluated for cancer, without the image ever being in the plain at system 110 and without system 110 knowing what the outcome of the cancer evaluation is.

Other applications involve, database services, e.g., looking up encrypted data in an encrypted database; for example, the computation may be a comparison between an input item and a database item. For example, multiple computations may be combined to produce a database index that matches an index. For example, the database, may be a genomic database, and the input a gene sequence. For example, system 110 may be used for protected control of a device. For example, a device, even a large device such as a power plant, may send sensor values to system 110 and receive encrypted control signals in return; the control signals being computed from the sensor signals. An attacker of the system may be able to determine the contents of data going to and from system 110, or even gain access to intermediate data of system 110, but he will not be helped by that as the data is encrypted. Even a full break of system 110 will not reveal the data, as the decryption key is not known to system 110. Computing the control signal may involve such mathematical operation as linear algebra, averages, matrix multiplication, polynomial evaluations, and so on, all of which are possible to execute with FHE operations.

For example, a store, e.g., a collection in a storage, of encrypted data items may be maintained in the FHE system; some of these may be received some may be the result of an FHE computation, e.g., intermediate results. For example, the FHE system may be configured to apply an FHE operation to one, two or more encrypted data items in a store, e.g., a collection of input and/or intermediate and/or output values. The result will be a new encrypted data item that may be stored in the store. The encrypted data store may be stored in a storage of the FHE system. This may be local storage or a distributed storage. In the latter case, it may happen that one or more encrypted data items are represented multiple times in the encrypted data store. Encrypted data items may be sent from one computing device to another, e.g., if their values are needed elsewhere. The encrypted data store may be implemented in various ways, e.g., as a register file, an array, various data structure, and so on.

For example, in an FHE scheme based on the Learning With Errors (LWE) problem, e.g., such as the Torus-FHE (TFHE) mentioned in the background, an encryption key may be a string of n digits $s_i$, a ciphertext may be a tuple $(a_1, \ldots, a_n, b)$ with $b-\Sigma_{j=1}^{n}s_j \cdot a_j = \mu + e$. In the latter, + and · respectively represents the addition between torus elements and a product between integers and torus elements, $a_i$ are n torus elements, $\mu$ is the plain data item as a torus element, and e is the noise, e.g., a torus element drawn from a probability distribution, e.g., a Gaussian distribution. Conventionally, the secret digits $s_1, \ldots, s_n$ of the secret key s are bits; this is not necessary though. The secret digits s could take on more than 2 values, e.g., three values (ternary digits), four values, or even more.

This scheme naturally extends to other mathematical structures, including based on polynomials. The numbers $s_i$, $d_i$, b, u, e may therefore be taken from a different mathematical structure. Not all encrypted data items need to be encrypted under the same key, and in fact re-encryptions with a different key is a possible FHE operation. To convert from one key to another a so-called key-switching procedure may be used, which may use so-called key-switching keys. Key-switching keys provide information on how elements encrypted under a first key can be re-encrypted under a second key, without revealing either key.

The encrypted data items may represent all kinds of data. For example, encrypted data items may represent numbers that need to be averaged, or which are used for linear regression, etc. For example, the encrypted data items may represent an image. For example, each pixel of the image may correspond to one or more encrypted data items. For example, a grey-scale pixel may be represented by a grey level, which in turn may be represented by a single encrypted data item. For example, 256 grey levels may be encoded in a single encrypted data item. For example, a color pixel may be represented as multiple color levels, e.g., RGB levels, which in turn may be represented by a tuple of encrypted data items. For example, three 256-level colors may be encoded in three encrypted data items. How many encrypted data items are used to represent some type of data depends on the capacity of the FHE scheme. For example, more restrictive FHE schemes may only be capable of encoding one bit per encrypted data item. In that case, one color pixel, may require 24 encrypted data items.

Although without access to the decryption key it may not be possible to say exactly how large the noise is, one can typically bound the noise, e.g., as the initial noise level is known for a fresh encryption and the noise increase for various operations are known. Noise increase may depend on the type of operation, e.g., addition versus multiplication, and on the other parameters if any. For example, an FHE operation may be multiplication with a known, e.g., plain value, e.g., multiplication by 2, multiplication with a known polynomial, and so on. For example, multiplication with a larger value may increase the noise more than multiplication with a smaller value. Exactly how much noise increases given the performed operations can be calculated mathematically, or could be estimated empirically. While some operations may add significant amounts of noise, others may not add noise, e.g., an addition with a plain constant.

A set of FHE operations may be defined for the computation. For example, from a target FHE computation, a network or circuit of operations may be built that together implement the computation. For example, the operations may be Boolean operations. For example, the operations may all be NAND operations. The way the FHE operations are combined, e.g., which operation is applied to which operand in the encrypted data store determines the computation that is being performed. For example, the computation may be represented as a list of FHE operations that are to be performed together with an indication on which FHE encrypted data item they are to be performed.

As operations are performed, the noise associated with the new computed (not-fresh) encrypted data items may grow. This is not a problem so long the noise stays within a limit needed for decryption. If more operations are to be performed, a bootstrapping operation can be performed.

The size of encrypted data items in an FHE scheme can be quite large. Moreover, the more operations an FHE scheme is to perform without a bootstrapping operation the larger the size of an encrypted data item typically will be. Likewise, a higher resistance against attacks may be obtained with larger FHE parameters and in turn with larger encrypted data items. For example, the data items may be mapped to an FHE system featuring larger FHE parameters, so that more noise can be added while still being able to successfully perform operations. Increasing the range of values that a secret key digit can take on, will increase the entropy, and thus contribute to the FHE security.

FIG. 1c schematically shows an example of an embodiment of a system for performing a computation using FHE. Shown in FIG. 1c is the data provider system 160, and three FHE devices: Devices 111, 112, and 113. Each of devices 111, 112, and 113 are capable of performing FHE operations on encrypted data items. Together the three devices form the FHE system. There may be two or more than three FHE devices cooperating to form an FHE system.

In the case of FIG. 1c, the computation is distributed over multiple FHE devices, in the example shown, three FHE devices. For example, one of the multiple FHE devices may transmit encrypted data items to one or more of the other multiple FHE devices, e.g., received encrypted data items or intermediate encrypted data items, e.g., partial computation results. Likewise, each of the multiple FHE devices may be configured to receive encrypted data items from the other devices.

A prime example of a computation network for which there is a desire to transform it from conventional computation into FHE computation are neural networks. In an embodiment, a system for converting takes a first neural network as input, which is an example of a first computation network, and generates a second neural network as output, which is an example of a second computation network. The second computation network may comprise a representation of FHE operators, their parameters, and so on. The second computation network computes the function represented by the first computation network, or typically, an approximation of the function. Especially, for neural networks, computing an approximation is acceptable.

Converting a computational network is not limited to neural networks, although these are an important class of functions that can be well converted in this manner. Neural networks are often insensitive to small inaccuracies introduced throughout the computation. Thus neural networks tend to convert into especially efficient second computational networks using an embodiment.

Encrypted values in an FHE scheme are typically limited to a fixed number of bits. The term real number or real is used herein to indicate a number that needs not be an integer. Although the word real is used, in FHE such numbers are typically represented in a number format comprising multiple digits. Typically, fixed-point precision is used to represent reals, rather than floating-point numbers. For example, in TFHE encrypted values may be numbers restricted to an interval, typically, between 0 (inclusive) and 1 (exclusive). For example, real numbers may be values between 0 and 1 having a fixed precision, say, of 32 bit or 64 bit. Even if values on the torus are within an interval, e.g., are modulo 1, a value on the torus may be represented by values outside the interval, but with the understanding that two values x and y represent the same torus value if they are equal modulo 1.

In embodiments, real numbers are represented in a finite digital real-number representation, typically representing a rational approximation of the real number. Floating point or fixed point representation are typical examples of such real-number representations. A real-valued matrix multiplication may comprise a real-valued matrix multiplication represented by a real-valued matrix and optionally a real-valued vector addition represented by a real-valued vector. In an embodiment, one, or more, or all elements of the real-valued matrix are represented in a finite digital real-number representation. In an embodiment, one, or more, or all elements of the real-valued vector are represented in a finite digital real-number representation. In an embodiment, all elements of both the real-value matrix and the real-valued vector are represented in a finite digital real-number representation; this is not necessary though and mixed representation matrix and/or vectors are a possibility. The floating point number format is described in, e.g., IEEE 754.

Evaluating a neural network as a second computational network of FHE operation is useful to improve the privacy of users. Other examples of computation networks include: (i) running a medical test on one's private information, e.g., DNA data without revealing either the private information or the result of the test, (ii) spam detection: one can detect if a mail is a spam without having the key to decrypt it, e.g., without seeing the mail.

An example of the former system may comprise a first device where medical data is obtained, e.g., received from on more sensors. The sensors may include, e.g., a temperature sensor. The sensors may include image sensors. The data is encoded according to an input encoding and encrypted using a secret key. The encrypted data may then be sent to a medical device where a second computational network is applied to the encrypted data. The encrypted output may be a classification of the input, e.g., an image classification. The encrypted result can be sent back to the medical device for decryption and decoding.

An example of the latter system may comprise a first mail device where e-mail is received, the e-mail may then be encrypted according to the FHE scheme, e.g., using a secret key known at the first mail device. The first mail device may first encode the mail to a series of torus points, e.g., using an input encoding, and then encrypt the series to a series of encrypted values, e.g., using an LWE representation. The encrypted series is then sent to a spam-detector device, where a second computational network is installed. The encrypted values may also include other information, e.g., meta data, e.g., origin and/or destination addresses. The second computational network is applied to the series of encrypted values and produces an encrypted result, e.g., a binary spam or no-spam result, or a real-valued number, say, representing a probability that the mail is spam. The second computational network is obtained as a conversion from a first computational network, e.g., trained for spam detection.

The encrypted output value (or values) is then sent from the spam-detector device to the first mail device, where the output is decrypted, e.g., using the secret key, and decoded, e.g., using an output decoding. Based on the result, the first mail device may discard the mail or not. For example, the first mail device may decide to display or not show the mail based on the decrypted output, or decide whether to forward the mail to a second mail device.

Interesting use-cases are machine-learning (ML) algorithms executed on untrusted platforms, while maintaining user privacy: by using FHE in this case, one can keep user's data or the results thereof private.

Fully homomorphic encryption (FHE) is an encryption paradigm where one can perform computations on encrypted data using only public material. The FHE scheme does not require knowing, e.g., a private key of the user, and does not to decrypt ciphertexts. There exist several kinds of FHE schemes, TFHE (for Torus-FHE) schemes are currently an efficient choice. TFHE schemes support an efficient bootstrapping (BS), which allows to reduce the noise in the scheme, and thus, support the homomorphic evaluation of neural networks (NN) as deep as desired. Furthermore, the bootstrapping operation can be combined with any function that needs to be performed on data, thus combining function evaluation and noise reduction. This feature is referred to as programmable bootstrapping (PBS). For example, a programmable bootstrapping can reduce noise and perform, say, an activation function at the same time.

A preferred class of FHE schemes are torus-based schemes, referred to as TFHE schemes. In a torus-based scheme, values may be represented modulo 1. For example, the TFHE scheme may be based on the Learning With Errors (LWE) problem mentioned above. A preferred implementation of a TFHE scheme and programmable bootstrapping is provided in the paper "Programmable Bootstrapping Enables Efficient Homomorphic Inference of Deep Neural Networks", included herein by reference.

Moreover, TFHE supports some operations directly on the encrypted data without performing bootstrapping. These operations include: modular addition, typically with 1 as the modulus, and multiplication between a (clear) integer and an encrypted value, represented as a torus element. Encrypted values in a torus scheme are mapped onto real-valued numbers modulo 1, e.g., between 0 (inclusive) and 1 (exclusive). Although reference is made to real numbers, these values are typically represented in a fixed precision, as, say, a 32 or 64-bit number, and not in say IEEE 754 representation.

One of the limits of TFHE is that multiplying a ciphertext by a real number is not defined, since the product of a real number by a torus element is not defined. Advantageously, the multiplication of a ciphertext by an integer can be done without a programmable bootstrapping. In an embodiment, the second computational network is TFHE-based, which, when executed, computes a neural network over encrypted input data. The parameters that define the second computational network are allowed to be plain values, that is the model does not need to be confidential, even though, it operates on encrypted values, e.g., encrypted input, intermediate and output values. Encrypted values may represent values on a torus, e.g., may represent real numbers modulo one. For example, a value on the torus ($\mu$) may be encrypted as an LWE ciphertext, e.g., by masking the value with a mask (b) that is obtained as a dot-product (b=s·a) of a series of key digits ($s_i$) and a series of masking values ($a_i$) with a noise (e): $b - \sum_{j=1}^{n} s_j \cdot a_j = \mu + e$. Conveniently, the torus points are mapped to a discrete ring.

Operations that are performed in the first computational network must be translated into operation for the second computation network.

A first difficulty in transforming a first computation network, such as a neural network, to an FHE computation network is that the first computation network may contain multiplications between an encrypted value and a non-integer value. Such operations can be done, e.g., using a programmable bootstrapping. For example, in a neural network one may encounter such operations as convolutions, matrix multiplications, batch normalization, etc. There are several approaches to take when avoiding such multiplications between a real-valued number and an encrypted value. For example one may:

Implement real-valued multiplication as one or more PBS operations. This approach is preferred for first computation networks in which such multiplication do not occur often, as the PBS is an expensive operation.

If the first computation network is a neural network modify the training such that only integer-valued multiplications are obtained, e.g., using an integer-only training algorithm, Round the real-valued multiplicand to a nearest integer Round the real-valued multiplicand to a nearest integer, but first multiply the real number with an expansion factor to reduce an accuracy loss. Subsequent operations can be adjusted to expect an input that has been multiplied with the expansion factor. For example, one can take an expansion factor such as 2 or more, 2.5 or more, 3 or more, etc.

The latter approach can be even more refined by choosing larger expansion factors for more important operations.

It will be assumed that multiplication between a plain real number and an encrypted value has been taken care of: typically eliminated or possibly marked as to be implemented as a PBS.

A further issue is that operations in the first computation network are often not constrained to remain in a particular small interval, but encrypted values in the FHE operations are restricted to be on the torus, and thus modulo a modulus, typically, modulo 1. One solution to this is to scale all values in the first computation network to values so that they are sufficiently small and are between 0 and 1 and stay between 0 and 1. If values increase too much, they can occasionally be scaled to smaller values. Nonlinear operations can be adapted to expected scaled values rather than the original values. Interestingly, a matrix multiplication, being linear, works on a scaled value as well as on the unscaled value. A matrix addition can be scaled in proportion to the scaled variables.

The inventors have found that the accuracy of the second computational network can be improved, e.g., to provide outputs that are closer to the first computational network, or that are closer to the function that the first computational network models, by improving the encoding of values in the first computational network into encrypted values for the second computational network, e.g., values that are between 0 and 1.

In an embodiment, a first scaling factor is determined for a first set of values, e.g., one or more layers, and a second scaling factor is determined for a second set of values, e.g., one or more layers. The second set does not overlap the first set. In particular, a scaling factor can be determined for all values, by determining a scaling factor for multiple sets of values, e.g., each set comprising one or more layers, until all values have a scaling factor, the multiple sets of values being not overlapping.

FIG. 2 schematically shows an example of an embodiment of a converting system 200. System 200 is configured to convert a first computation network of operations arranged to compute a function into a second computation network of FHE operations arranged to compute the same function. An important class of networks are neural networks, but the computational networks may also represent other functions. FIG. 2 schematically shows a first computation network 210, of which operations 211, 212 and 214 are shown. Typically, first computation network 210 will comprise more than 3 operations, e.g., more than 10, more than 100, etc.

Many operations in the first computation network can be directly transformed into operations that can be natively performed on encrypted values, e.g., without using a programmable bootstrapping, e.g., as an encrypted operation with a computation cost comparable to the original non-encrypted computation. For example, addition of two encrypted values is natively possible in Torus based schemes. Multiplication between a plain integer and an encrypted value is also natively possible. Addition and integer multiplication are natively possible, in particular, in TFHE schemes. The combination of acting on a torus point encrypted using LWE is advantageous, especially in combination with a programmable bootstrapping.

This means that integral matrix multiplication can be natively performed on encrypted values. The integral matrix may be $1 \times n$, with $n=1, 2, 3, \ldots$ also much larger values of n are possible, e.g., 100 or more, 1000 or more, etc. The integral matrix may be $m \times n$, with n, $m=2, 3, \ldots$ also much larger values of n and m are possible one or both may be, e.g., 100 or more, 1000 or more, etc. More dimensions for matrices are also possible, e.g., more than two dimensions. Also convolutions with an integer kernel and batch normalization with an integer multiplicand can be natively performed. In fact, these operations can be seen as a type of matrix multiplication.

One of the constraints of TFHE is that one needs to work with elements on the torus, or, in other words, that computations are done on the torus, e.g., implicitly modulo 1 (here the modulus is taken to be 1 for convenience, as other values could be taken as well). We remind that x modulo 1 is the number $x_r$ in $[0,1[$, such that there exists an integer k such that $x=x_r+k$. We write $x_r=x \bmod 1$. Torus elements are real numbers in $[0,1[$. Thus, taking a neural network (NN) and turning it into a TFHE-based homomorphic version cannot be done without taking this constraint into account even if the NN uses no (or few) multiplications by real numbers.

In this invention, a method is proposed to determine encodings for the values that occur in the first computational network. An encoding from a value x in the first computational network is preferably a mapping $x'=ax+b$, with $x'$ is the value occurring in the second computation network. Input values are assumed to be received already encoded such that the input values fit in the required range. Operations in the second computational network are adjusted so that intermediate values and output values are also encoded as desired, e.g., to fit in the prescribed range. The value a is called the scaling factor. The value b is called the shift. The inverse of the scaling factor is sometimes referred to as the encoding divisor or divisor: $d=1/a$. For example, an encoding can be assigned to each value occurring in the first computational network, and a corresponding value in the second computation network. Such a correspondence needs not be known explicitly when using the second computational network, as the operations are adjusted to produce values in the desired encoding.

Note that these encodings are compatible with linear operations, in particular matrix operations. The linear operations preserve the scaling factor of encodings. The shift can be ignored for the linear operations, but not for non-linear operations like a PBS. Once a value enters a PBS, the shift can be determined and applied on the input of the PBS, or directly incorporated in the previous operation. The PBS itself can be adjusted for shift and scaling factor. That is the PBS can be configured with a test vector that configures the PBS for a particular input-output behavior, so that given an encoded input value as the input of the PBS, the output is an encoding of the desired function applied to the input value. Needless to say, the input value and output value are not only encoded but also encrypted.

A PBS adjusted to receive encoded values may produce values in a fixed encoding, e.g., the encoding with shift zero and scaling factor 1. In a more advanced embodiment, a PBS can be modified to produce values in an encoding that is chosen for that operation, such that it optimizes further operations, depending on the architecture. Encodings can be optimized for the data that is expected to be processed, and the architecture of the computational network.

Values are typically modulo 1 in a TFHE-based second computation network, and so, most of the values lie in a range of size 1. When a value is used as the input of a PBS, its range must often be even narrower: it needs to be in [0, $\varepsilon$[, for a certain $\varepsilon$. A regular PBS, e.g., an activation function, in one type of TFHE typically expects $\varepsilon=\frac{1}{2}$ but other values for $\varepsilon$ may be used. In the same scheme, a MaxPool operation has half the range, e.g., $\varepsilon=\frac{1}{4}$ but other values for $\varepsilon$ may be used. On the other hand, when using a PBS which is negacyclic, e.g., a function $f$ where $f(x+\frac{1}{2})=-f(x)$ for $x\in[0,1[$ one can use the entire torus, e.g., $\varepsilon=1$. Different types of torus FHE may have different ranges that are supported.

An important application is to transform a neural network into an TFHE-based equivalent, where the neural network is executed over encrypted data. For example, this is useful to ensure privacy of user. For example, to run a medical test on one's private information (e.g., comprising DNA information) without revealing either the private information nor the result of the test.

In an embodiment, the first computation network and the second computation network of operations are configured to take an image as input. For example, the first computation network and the second computation network may be a neural network taking at least an image as input. The image may be a medical image.

The operations in the first computation network comprise matrix operations (y=Wx+B) including an integral matrix multiplication W and further operations (z=A(y)). The matrix operations are converted into matrix operations in the second computational network, except that they are performed on encrypted values, the further operations may be converted into one or more PBS operations.

Converting system 200 may comprise a first computation network 210. First computation network 210 may be a neural network or the like. First computation network 210 may be configured to operate using conventional arithmetic. Operations 211-214 are shown. First computation network 210 may be stored in a storage of system 200, e.g., by storing the parameters of network 210. Converting system 200 may produce a second computation network 220. Second computation network 220 comprises FHE operations corresponding to the operations in the first computation network. Operations 221-224 are shown. Optionally, second computation network 220 may comprise additional operations; in this example operation 223 is inserted while the other operations have a corresponding operation in the first computation network 210. The operations in network 220 are configured to compute the same function, possibly at a lower accuracy, but operating on FHE values, in an embodiment on TFHE values. In an embodiment, a torus FHE is used using LWE encryption. In an embodiment, an FHE is used with a programmable bootstrapping that implies a prescribed range for its input.

Converting system 200 comprises a scaling factor unit 230 configured to determine a scaling factor of the encodings. Scaling factor unit 230 may also compute the shift of an encoding, but this is not always necessary.

Optionally, system 200 comprises a range unit 231 configured to determine for the input values of an operation that is to be converted a supported range of the input value in the first computation network. For example, range unit 231 may evaluate the first computation network on inputs in a sample storage 232, and observe the ranges of the values, e.g., input values, intermediate values, and output values of the first computational network. Range unit 231 is optional since the observed ranges could also be obtained from a third party, in particular from the same supplier as the first computational network. A supported range can be derived from an observed range; they may be equal, or the supported range may be taken a bit larger than the observed range, for example with a multiplicative margin, e.g. of 5% or more, or of 20% or more. As discussed herein, enlarging the supported range, or decreasing the scaling factor may be used to reduce the number of PBS test vectors in the second computational network.

Scaling factor unit 230 is configured to compute the scaling factor between the size of the supported range of a value in the first computational network and the size of a scaled range of the value in the second computational network, wherein applying the scaling factor to each input value's supported range is at most the size of the prescribed range. Scaling factor unit 230 may also insert operations in the first computation network, which are later represented by operations in the second computational network to improve encoding.

System 200 comprises a converting unit 240 configured to convert an operation in the first computational network to one or more operations in the second computational network. The operations in the second computational network are adjusted to receive input values scaled with the scaling factor. Examples of converting are given herein.

The efficiency of the second computational network can be increased by not insisting on having exactly the original accuracy in the second computational network. This is often possible, especially in a neural network, which by their nature allow some variation in their values. To obtain an indication of the accuracy of the second computational network, system 200 may comprise an optional accuracy unit 250. For example, accuracy unit 250 may evaluate the second computational network 220 on input values taken from a sample storage 251. The desired output for a set of input values may be obtained by evaluating them in the first computational network. Alternatively, storage 251 may comprise also the output values corresponding to a set of input values.

Optionally, system 200 may comprise a grouping unit 260 for reducing the number of PBS operations in the second computational network. The operation of unit 260 is explained herein.

Figure 3:
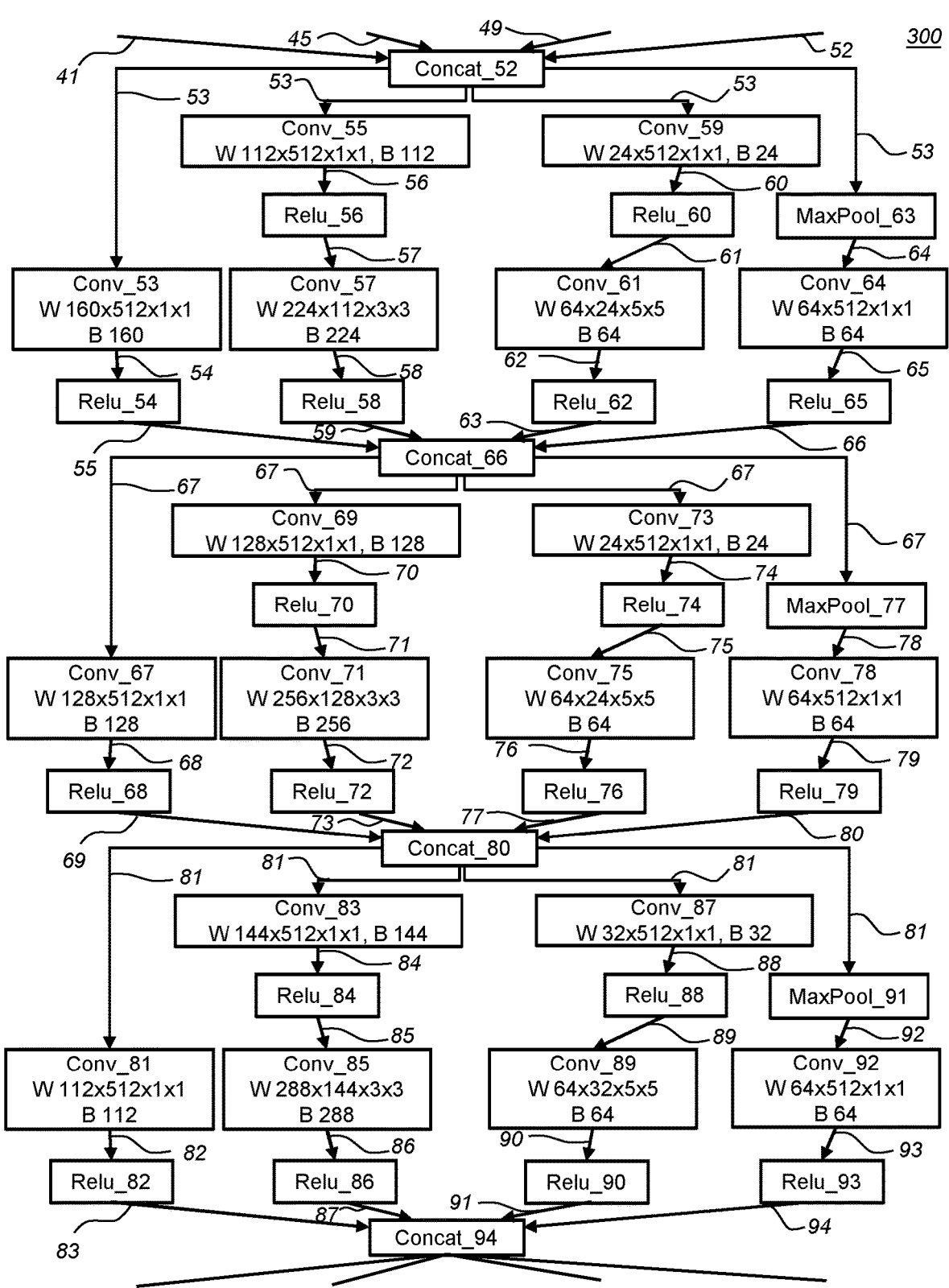
Figure 4:
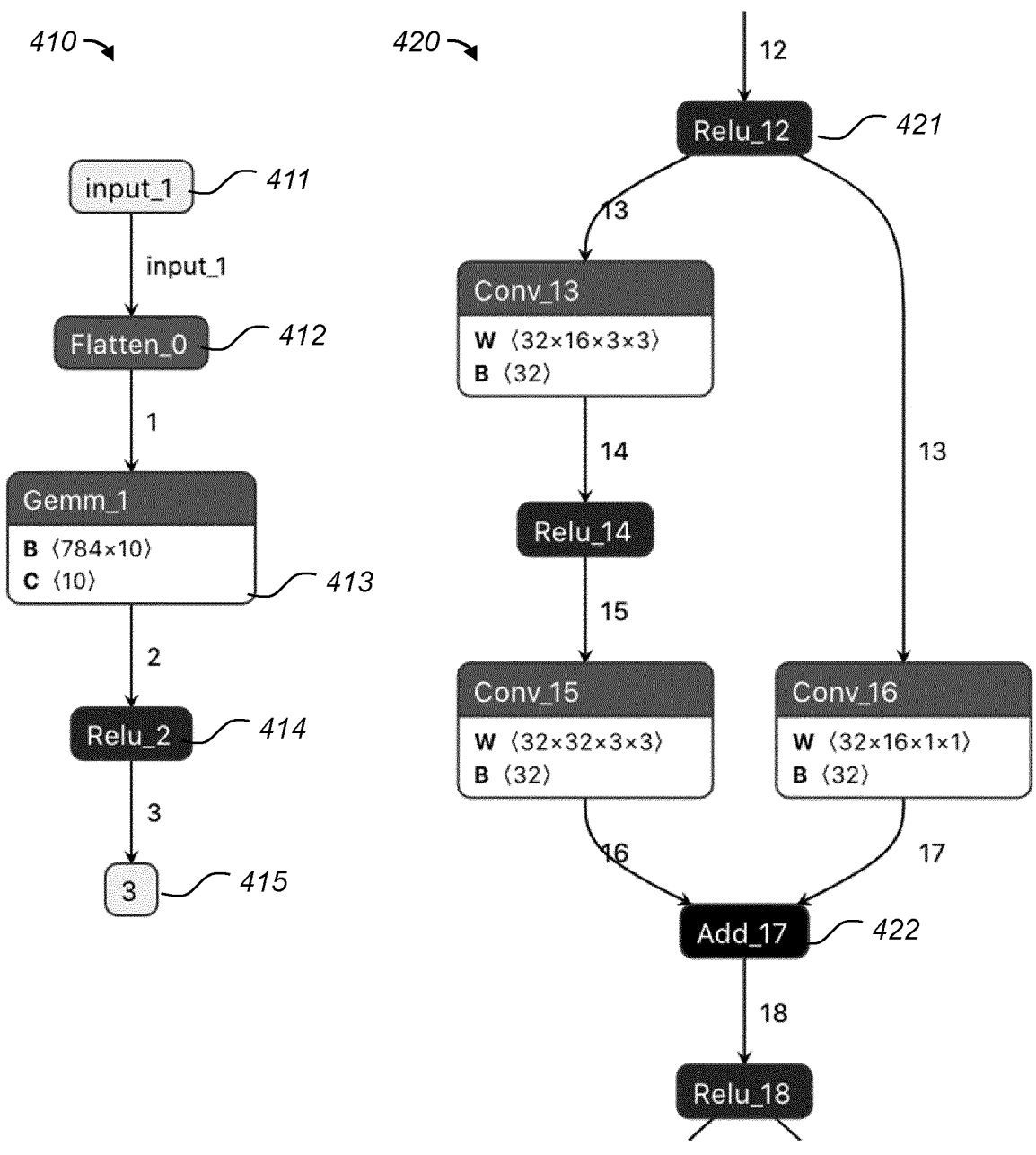
Figure 5:
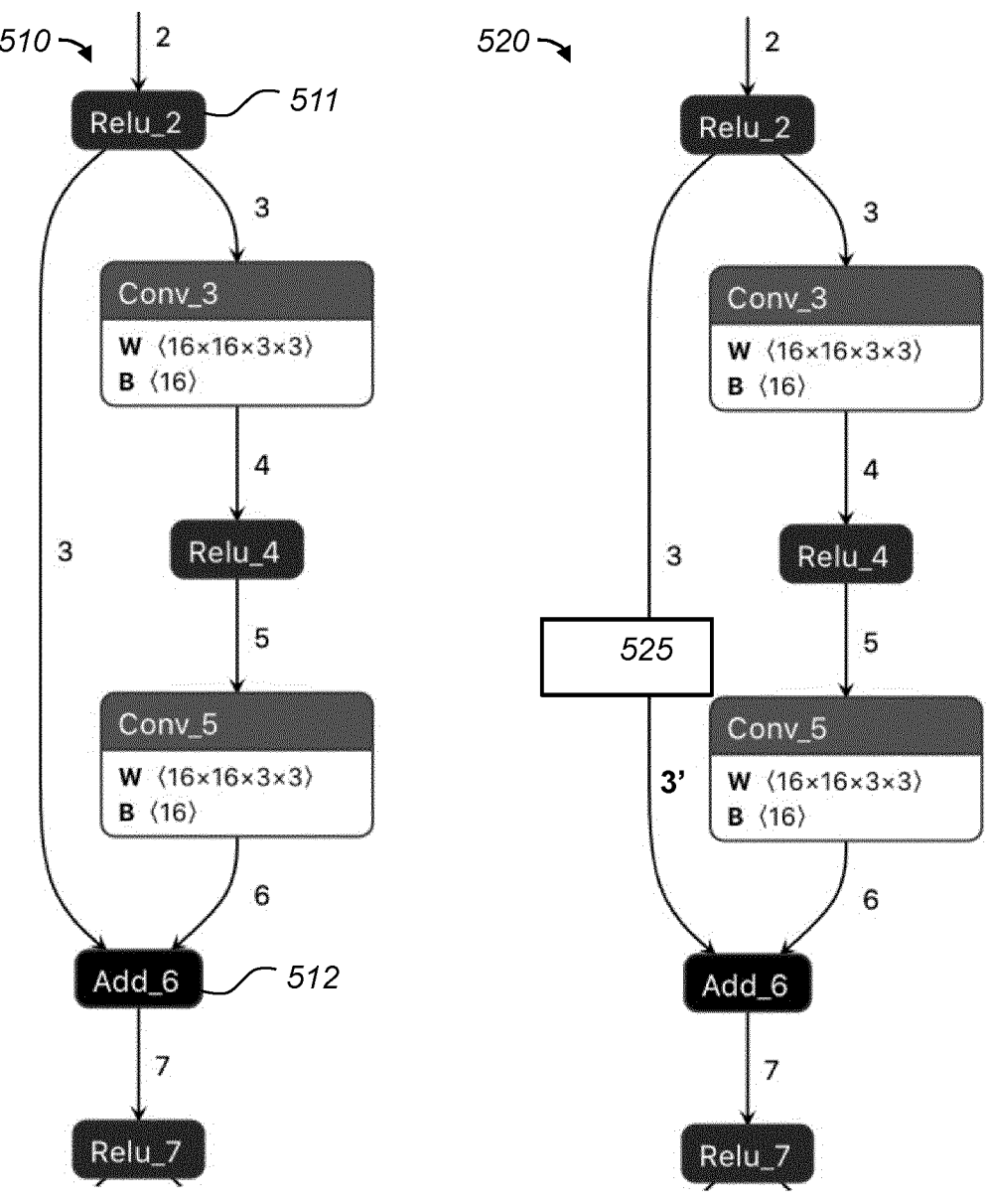

FIG. 3 is a fragment of a network called GoogleNet or Inception v1, the winner of ILSVRC 2014. Inception is a deep convolutional neural network architecture for object detection and image classification. More details of that network are available in the paper "Going deeper with convolutions" (included herein by reference) and on the corresponding page of inception_v1 (included herein by reference) on the Open Neural Network Exchange (ONNX) currently hosted on GitHub. The network in FIG. 3 has been modified compared to the original network by removing multiplications with a real-valued number. In this case, real-valued matrices have been converted by multiplying them with an expansion factor, and rounding individually the entries of the matrices to an integer. Operations that follow an expanded matrix are adjusted to expect an input that is correspondingly larger. As pointed out above, there are various ways to obtain a first computation network that avoids real-valued multiplications. This method is used to convert a computation network that has real-valued multiplication to one that does not, although there are various other options to do so. It is assumed that the conversion has taken place and that all matrix operations are adjusted to use an integer-valued matrix for the matrix multiplication.

Shown in FIG. 3 are multiple operations, and layers between them. Layers are denoted with a reference sign between 1 and 99. For example, the top of the FIG. 3 shows a concatenation operation. Concatenation operations are indicated as 'Concat_xx', where xx indicates the particular concatenation operation. The output of the concatenation operation is input to several other operations. The values that are output of one operation, and input to a next operation, are together referred to as a layer. In this case, the concatenation operation Concat_52 provides values for layer 53. The concatenation operation can be directly transformed to an FHE operation as it only changes the order of values, which can be done on plain as well as on encrypted values. A concatenation operation is an example of so-called join operation as it combines values from different operations. A join operation may require additional care as will be discussed below.

Also shown in FIG. 3 are convolution operations; indicated with 'Conv_xx'. A convolution is an example of a matrix operation. The real-valued matrix multiplication in the matrix operation is replaced by an integer-valued matrix multiplication. Functions that use the convolution result as input are assumed to be adjusted for the integer-valued convolution.

Also shown in FIG. 3 are ReLU operations. A ReLU is an example of a non-linear operation, often a further operation, the ReLU can also take input say from the concatenation operation. In the conversion a ReLU, being a non-linear operation, will be replaced with a programmable bootstrapping.

Also shown in FIG. 3 is a pool operation, in this case a MaxPool. Pool operations are a type of discretization process, in which an input set of values, e.g., an image, hidden-layer output matrix, etc., is down-sampled thus reducing its dimensionality. In the case of MaxPool, subsets of the values are replaced with their maximum. A MaxPool operation may be implemented by using a bootstrapping operation that takes the maximum of two values, and repeatedly apply it to obtain the maxima of the subsets. Note that a MaxPool can be implemented using a ReLU e.g., a MaxPool of two values a and b, can be implemented as a+A(b−a+¼), for a in [0, ¼ [and b in [0, ¼ [, by taking A(x)=ReLU(x−¼). Indeed, with such constraints on a and b, we know that $$b - a + \frac{1}{4}$$

is in [0, ½ [, and so can be the input of a PBS. A MaxPool over multiple values can be implemented as the repetition of multiple MaxPools over two values.

There are other examples of Pool operations in particular, AveragePool, in which subsets of the values are replaced with their average. An AveragePool may be implemented as summation, which can be done directly on the encrypted values and a division, which may be implemented as a programmable bootstrapping.

Other operations that may occur in a computation network such as a neural network include Flatten, Transpose, and Reshape operations. These are operations which move values around, and are readily transformed to work on encrypted values.

Dropout is an operation used in neural network training, but which is typically replaced with the identity during inferences.

An Add operation stands for additions of layers; it is a linear operation, but is typically a join operation, so that some care is needed, as discussed herein.

There are other operations that can occur, but which are not shown in FIG. 3; for example: Matrix Multiplication with a matrix of real-valued weights, and Batch Normalizations with real-valued scalars. A matrix operation is indicated with Gemm_xx.

Further examples of activation functions include: sigmoid function, softmax function, softplus function, softsign function, tanh function, selu function, elu function, exponential function, LeakyReLU layer, PReLU layer, ThresholdedReLU layer Generally speaking linear operations, and permutation type operations such as flatten or concatenate may be converted to linear or permutation operations in the second computational network. These operations preserve the scaling factor of input values though shifts may change. Other operations, in particular non-linear operations, e.g., activation functions such as sigmoid and ReLu functions may be implemented in a PBS. A PBS can be adjusted to accept an encoding. The output of the PBS may use a default encoding or may use a customized encoding.

Referring again to FIG. 2, a first computation network 210 such as shown in FIG. 3 may be adjusted to remove real-valued matrix multiplications. Such a network has been provided to an embodiment of system 200 and successfully converted to second computation network 220. In the case of FIG. 3, as a result the object detection can be run on an encrypted input image and the detected object can be produced in encrypted form.

For example, a file comprising the type of operations, their parameters, e.g., weights, and the connections in the network may be provided in a digital format. For example, system 200 may receive the first computation format from an external source outside of system 200. For example, system 200 may obtain the computation network as the output of a local compiler or of a neural network training unit, either of which may be installed on system 200.

To convert the first computation network, the matrix operations are transformed into corresponding operations that can be performed on FHE encrypted values, e.g., TFHE. In particular operations are converted to operations in an FHE, where the FHE has a native addition, and a programmable bootstrapping and wherein values and PBS inputs have a restricted range.

FIG. 4a schematically shows an example of an embodiment of a first computation network 410. In this example, a flatten operation Flatten_0 is followed by a matrix operation Gemm_1. These operations preserve the scaling factor although the Gemm_1 may change the shift.

Range unit 231 may determine for all values in layers input_1, 1, and 2 the range in which the values occur. For example, range unit 231 may evaluate the first computational network for multiple inputs and observe the ranges that values may have. Next for each of the layers a prescribed range can be determined. For example, assume the input of Gemm_1 and Flatten_0 operations (i.e., input_1 and 1 layer) have a prescribed range of size 1, while input of ReLu_2 (i.e., 2 layer) has a prescribed range of size ½. Note that the values are exemplifying, as a different implementation of these operations may have a different range size.

Scaling unit 230 can now determine a scaling factor such that multiplying a value in any of the layers input_1, 1, and 2, will make the size of its range fit into the prescribed range. For example, for each value in these layers one can compute (Prescribed range size in that layer)/(Size of the range of the value) and take the minimum over these values as the scaling factor. Should the minimum scaling factor be more than 1, then scaling is not necessary and the scaling factor can be taken to be 1, although scaling might still be used in an embodiment.

The scaling factor applied to the input of the second network (here, input_1) can be communicated to a user of the second computation network, so that he/she can scale the input values with the scaling factor before encrypting the input values and sending them to the system where the second computational network is evaluated. The flatten_0 and Gemm_1 operations have no requirement for shift. The flatten operation does not need adjustment. The matrix multiplication part of the matrix operation does not need adjustment either, though the matrix addition part in Gemm_1 may be multiplied by the scaling factor to keep the output value of Gemm_1 correct up to a scaling factor. At the input of ReLu_2, that is in layer 2, the encrypted values now only occur in ranges of the prescribed size, say ½. Note however, that some values in the layers up to and including layer 2 may have quite different ranges in the first computation network even after multiplication with the scaling factor, e.g., some values may occur in ranges of 199.7 to 200.2 whereas another value may occur say between −17.4 to −16.9. Since encrypted values in the second computation network are all modulo 1, a shift is applied to these values, so that the non-linear operation PBS correct the value correctly.

Values in the second computation network at the input to a linear operation are encoded according to some encoding and thus have an associated shift, but for the linear operation the shift can remain implicit, i.e., do not really need to be known or modified, since any value would be compatible with linear operation.

However, for the further operation ReLu_2 operation the shifts do need to be taken into account. The further operation is adjusted for the encoding, both for the scaling factor and for the shift. The shift offset is computed to shift the scaled supported range into the prescribed range. In an embodiment, this shift is determined for each value in layer 2 individually: in our example, the value in [199.7, 200.2[ could be shifted by −199.7 while the value in [−17.4, −16.9[ could be shifted by 17.4. The shift can be applied by inserting an addition operation between Gemm_1 and ReLu_2, though in this case the shift can advantageously be combined in the previous operation, i.e., within the bias in Gemm_1.

The further operation may now be performed for each value in layer 2 by, in principle, as many test vectors as there are different encodings in layer 2. Normally, test vectors depend on (input and output) scaling factors and (input and output) shifts. In our case, we took equal values for all the values in layer 2 in term of (input and output) scaling factors, so there are as many test vectors as there are shifts.

This will normally result in having as many test vectors as there are values in layer 2. In a more advanced embodiment, fewer test vectors than values in layer 2 may be needed by applying grouping to shifts, i.e., by making that several values of layer 2 share the same shift, as discussed herein.

The encoding of the output of ReLu_2 depends on the data, e.g., the observed ranges in layer 3.

The size of the larges range in layer i is referred to as $\delta_i$, which correspond to supported ranges. The different encodings in the second computation network are referred to as $E_i$. Layers input_1, 1 and 2 will have encodings $E_0$ all with an encoding divisor $d_0$ while layer 3 will have encodings $E_1$ all with an encoding divisor $d_1$. We can advantageously take encoding divisors as: $d_0 = \max(\delta_{input}, \delta_1, 2\delta_2)$ and $d_1 = \delta_3$, such that prescribed ranges are ensured.

The Shift is taken into account in layer 2, so that the PBSs can run on positive values. The PBSs which replace activation ReLu_2 may be adjusted as: Activation $(x) = ReLU((x - s_0)*d_0)/d_1 + s_1$. Wherein so is the shift of the encoding of the value on which the activation function is applied (i.e., so is the shift for 2), and which could be different for all values in that layer. The shift $s_1$ is a shift of the output function. For this particular activation function, one could take $s_1 = 0$, since the output of a ReLu function is already positive.

The supported range, e.g., the range of a value in the first computation network that will be supported may be determined from the observed range. For example, an observed range may be determined for each value by evaluating the first computation network and keeping track for each value what its maximum and minimum values are. One may set the observed range equal to the supported range. However, one may take the supported range a bit larger than the observed range. For example, a margin function may be applied to margins of the observed range. For example, the margin may be relative, e.g., a percentage may be added to the maximum value, e.g., 1% or more may be added, or 10% may be added; for the minimum value a corresponding amount may be subtracted. For example, the margin function may be absolute, e.g., a fixed amount may be added or subtracted, e.g., 1 or more, or 10 or more to the maximum or minimum values, respectively. Or, more simply, the margin function may be applied directly on the size of the prescribed range, e.g., 1% or more may be added, or 10% may be added, etc. For example, the amount added or subtracted may be the maximum of an absolute value and a relative value.

Having the supported range larger than the observed range provides a measure of safety; with the larger supported range it becomes less likely that an out of range value occurs in the second computational network. It also lets more room for noise, which is needed for security of FHE systems. In an embodiment, the amount added or subtracted is a multiple of the standard deviation of the value, e.g., twice the standard deviation of a value. The standard deviation may be determined, e.g., by the range unit 231.

The prescribed range may be prescribed by the particular (T)FHE scheme. In the TFHE scheme mentioned in the background one may use a range of prescribed size 1 for matrix operations, a prescribed range size of ½ for most activation functions, and a prescribed range size of ¼ for activation functions where the input is the addition of difference of two values. For example, a MaxPool implemented as a+Act(b−a+¼), with Act(x)=ReLu(x−¼), with a and b encrypted values, needs a and b to be in a range of size ¼ so that Act which is implemented as a PBS has an input range of size ½. Note that a shift may have to be adjusted in as well, depending on the shifts of a and b, so that the PBS has a positive input. Generally speaking, the prescribed range only depends on the type of operation and the type of TFHE, and not on the data that is processed. For example, obtaining the prescribed range and/or range size may be implemented as a lookup table mapping operation to range and/or range size.

For a TFHE scheme such as cited in the background, the prescribed range for a further operation is from 0 inclusive up to a value, which is typically less than or equal to 1. The prescribed range for a max-pool operation will typically be half the size of the prescribed range of an activation function. For example, $\varepsilon$ may be $\frac{1}{2}$ for most activation functions but $\frac{1}{4}$ for MaxPool operations. There are various ways known in the art to convert a function on multiple values to one with one input.

A scaling function may be defined for each value in the first computation network to a corresponding value in the second computation network, so that a value in the original first computation network is mapped to the corresponding value on the torus in the second computational network. Note that the torus value in turn may be represented by a value modulo a modulus, e.g., $2^q$. Values on the torus are often represented in practical implementations as a suitable finite ring. For example, one may represent elements as $x=a/m$, where $0<=x<1$ and $0<=a<m$, it allows to more or less to replace $x$ by a only, where a is an integer. Here m represents a suitably large integer, e.g., $2^q$. The elements of the torus, the reals mod 1, cannot all be written as a fraction $a/m$, but all of them can be well approximated by some $a/m$.

The scaling function is applied, the scaling function $x'=x/d+s$ may be defined by a scaling factor ($1/d$) and a scaling addition or shift (s). Note that the shift s may well be different for each value, e.g., per neuron. We remind that a neural network is made of tensors, and that individual elements of these tensors are called neurons. The shift might have a different value for each neuron, although steps can be taken to reduce the number of different shifts.

In an embodiment, values in the same layer having the same scaling factor, though they may have a different shift. Assigning the same scaling factor to all values in a layer is not strictly necessary. It is possible to keep track of optimized divisors per value. Indeed, for PBS applications this would not take much additional work, as multiple PBS test vectors are often needed for a layer anyway. In addition to varying the PBS for a different shift, the scaling factor of the encoding function may be taken into account at no additional costs. However, if linear operations occur often, as they do in, say, neural networks, it will turn out that most divisors in a layer need to be equal anyway. Keeping track of individual divisors per value may occasionally give a better encoding, e.g., when the network comprises a split operation, e.g., the opposite of a concatenation.

The operations are adjusted to receive the input values scaled with the scaling factor that is assigned to the input. The shifts of the input encodings are known and can be used to compute the relevant shift for operations computed on the input values or on intermediate values that are derived from it. For a matrix operation, with a matrix multiplication and a matrix addition, e.g., $Wx+B$, adjusting the matrix operation only needs to adjust the matrix addition ($B'=B/d_1$). The matrix can stay as it is, assuming it is already an integer matrix. Note that the values that go into the matrix operation will have an associated shift, which will change due to the matrix operation. The shift can be implicit however as no explicit adjustment for the shift is needed at this point. A further operation $A(x)$ is adjusted to receive the input values scaled with the scaling factor and shifted with a shift value ($A(d_1x-s_1)$). This may mean as many adjusted further operations as there are shifts in a given layer. A further operation $f(\ )$ may thus be converted into multiple TFHE operations, each adjusted for the same scaling factor and multiple different shift values ($f(d_1x-s_i)$). If an output encoding is used, the series of PBS that are applied to the values in the layer may each have the same scaling factor.

Example Matrix Operation Followed by Activation

As an example consider the following first computation network: suppose we compute $y=W\cdot x+B$ and $z=$Activation $(y)$, where $x$ is an encrypted input tensor and $z$ is the encrypted output tensor, where $W$ is a constant integer tensor called weight and $B$ is a constant real-valued tensor called a bias. Here, $x$, $y$ and $z$ are real-valued. Tensor can be regarded as matrices. The goal is to transform this small NN into a homomorphic NN with the same accuracy which runs with elements in the torus, e.g., to replace original operations by operations which can be executed modulo 1 while changing the accuracy as little as possible.

Define two so-called encoding divisors $d_0$ and $d_1$, e.g., as real-valued numbers, and two shifts $s_0$ and $s_1$, e.g., as two vectors corresponding in size to $y$ and comprising real numbers, and replace the computation by $x'=x/d_0$, $y'=W\cdot x'+B'$, and $z'=$Activation$'(y')$, where $B'=B+s_0$ and Activation$'$ is the function Activation$'(x)=$Activation $((x-s_0)*d_0)/d_1+s_1$.

The divisor $d_0$ is chosen appropriately such that:

$x'$ occurs in a range whose size is smaller than 1

$y'$ occurs in a range whose size is smaller than $\varepsilon$ (because $y'$ is the input of a PBS). As an example, one may take $\varepsilon=\frac{1}{2}$.

$s_0$ is chosen such that $y'$ is strictly in $[0, \varepsilon[$ (because $y'$ is the input of a PBS)

Activation$'$ is replaced by a PBS, which is possible and correct since the input of this PBS is positive and smaller than one half $d_1$ is chosen such that $z'$ stands in a range whose size is smaller than 1

$s_1$ is chosen such that $z'$ is strictly in $[0,1[$

Once $d_0$, $d_1$, $s_0$ and $s_1$ are chosen, one can have the full FHE path:

the encoding of the input, e.g., the computation of $x'=x/d_0$ is done before the homomorphic encryption.

then, $x'$ is encrypted and becomes the input of the homomorphic NN $y'$ and $z'$ are the two layers of the homomorphic NN; inherently, computations are done modulo 1 at the end, $z'$ is decrypted, and $z$ can be recovered in the cleartext by $z=(z'-s_1)*d_1$ Note that encoding of $x$, encryption of $x'$, decryption of $z'$ and decoding to obtain $z$ will typically be done at a different system or location than the evaluation of the second computation network.

Although this example, is illustrative, finding encodings becomes more complicated when neural network is deeper and/or has a more complex topology.

FIG. 4b schematically shows an example of an embodiment of a first computation network. FIG. 4b shows a fork layer 13. A fork layer is defined as a layer which is used in at least two different operations. Layer 13 is a fork layer because it is used as an input in two different operations: Conv_13 and Conv_16.

The corresponding operation that produces layer 13 is the fork operation 421, here ReLu_12. FIG. 4b shows a join layer 18. A Join layer is a layer which uses the result of two or more previously-computed layers. Layer 18 is a join layer because it uses as an input two different layers: layer 16 and 17 produced by operations Conv_15 and Conv_16 respectively. The corresponding operation that produces layer 18 is the join operation 422, here Add_17. Join layers are typically implemented in the second computational network as native operations, in this case as additions.

Fork layers are thus used as a source for several layers, while join layers is a layer which use two previous layers or more. Typically, joins are additions, subtraction, concatenation. More generally, any operation using 2 or more sources and implemented with native operations may be regarded as a join layer. When several sources are coming to a join layer, their scaling factor should be equal or made equal. Consider an Add join layer, if the two scaling factors are not equal, the resulting addition will no longer stand in a relation with the original addition output. When the first computation network comprises joins, solving the encodings—that is finding appropriate encoding divisors—is more complicated. In an embodiment, an operation in the first computation network receives input values from multiple earlier operations, and the corresponding operation in the second computation network receives input values from corresponding multiple earlier operations scaled with a scaling factor that is equal for all input values of said corresponding operation.

Fork and join layers are important for many classical neural networks, such as e.g., Resnet, VGG, mobilenet, to just name of few.

Encoding in the presence of join layers may be resolved as follows. The scaling unit may be configured to Keep a list of all layers $L_i$ in the first computational network Keep a list of encodings divisors: $d_j$.

To each layer a symbolic encoding divisor $d_j$ is assigned. Note there is a correspondence between the layers and the encoding divisors in the sense that each layer corresponds to one divisor but a divisor can correspond to multiple layers.

The layers before and after a linear operation (such as a matrix operation or an addition with a constant or operations like Flatten, Reshape, Transpose which just reorder values) are assigned the same encoding divisor, though the layer after a PBS may have a new encoding divisor A join layer imposes the condition that the input encodings are equal, thus reducing the number of divisors. For example, by making some $d_j$'s equal, and thus reducing the number of independent $d_j$'s.

For each encoding divisor $d_j$, look at the layers $L_i$ that have that encoding divisor Take the maximum of the (size of a supported range)/ (prescribed range for that layer) over all values in said layers, and set the encoding divisor $d_j$ to that maximum value We remind that an encoding divisor $d_j$ correspond to a scaling factor $a_j=1/d_j$ It is not necessary that PBSs introduce a new encoding divisor. Instead, one may only force some encodings to be equal and/or introduce encoding converting functions. Introducing new encoding divisors through a PBS is advantageous however, as it imposes little cost and allows more flexibility in solving constraints which are due to Join operations. For example, a PBS may be changed as $A(\ )/d_2$ or $A(\ )/d_2+s_2$, note that the PBS may also be adjusted for the encoding of the input values, which is not shown here. Introducing an encoding divisor in the output of a PBS increases the number of divisors $d_j$'s. Having more divisors means that the encodings are more independent, because the number of layers $L_i$ sharing the same $d_j$ is reduced, and so, $d_j$ can be optimized more independently of each other. As a result, a better encoding may be found, e.g., the scaled ranges may be closer to the prescribed ranges, so that there is less accuracy loss due to scaling.

In an embodiment, converting the first computation network comprises inserting one or more further operations in the first computational network between two operations corresponding to an operation in the first computation network to transition from one scaling factor to another scaling factor, e.g., introducing an additional scaling factor. Such an inserted operation is referred to as a rescaling operation. Note that it is not necessary to insert further operations when converting the first computation network comprises, for example, if one does not insert new encoding divisors in PBS.

FIG. 5a schematically shows an example of an embodiment of a first computation network 510. FIG. 5b schematically shows an example of an embodiment of a first computation network 520 which is the same as first computation network 510 with an additional operation 525 inserted. The rescaling function is inserted between a PBS, in this case ReLu_2 and a join operation, in this case, Add_6.

In FIG. 5a, without an inserted rescaling, the scaling factors of layers 3 and 6 would be the same, as they are input to a join operation. Since Conv_5 does not change the scaling factor, layer 5 would have the same scaling factor as layer 6. Since Conv_3 does not change the scaling factor, layer 4 would have the same scaling factor as layer 3. Also the Add_6 does not change the scaling factor. In short, all layers: 3, 4, 5, 6, 7 would have the same scaling factor. For example, if layers 3 and/or 4 have relatively large ranges for their values, then this would imply a small scaling factor even if, say, in the other layers the ranges are smaller so that larger scaling factors could be used. Using the same smaller scaling factor in all these layers would have the consequence of reducing the accuracy, due to loss of precision in computations, or requiring much larger cryptographic parameters.

In FIG. 5b, a rescaling 525 is introduced. Here layers 3', 6, 5, and 7 have the same scaling factor, say $a_1$, and layers 3 and 4 have the same scaling factor, say $a_2$. These two scaling factors may be different, in which case the PBS ReLu_4 would change the scaling factor, which is a possibility. In this case, scaling factor 1 may be small to accommodate the large ranges in layers 3 and 4, while scaling factor $a_2$ may be larger as allowed by the smaller ranges in the remainder of the network.

A rescaling can be introduced in a branch of a join operation, e.g., if the scaling factor becomes quite small, e.g., smaller than a threshold. For example, a rescaling is advantageous right before a join operation, in a branch between fork and join where there is no PBS.

There are other situations, in which a rescaling can be applied advantageously. For example, consider the following example:

U1=PBS_1 ( ); U2=PBS_2 ( . . . );
X1=Gemm_1 (U1); X2=Gemm_2 (U2);
X3=Join (X1, X2); X4=PBS_3 (X3);

Here, layers U1 and U2 are the result of a PBS. Layers X1 and X2 are the result of a matrix operation, here a Gemm. They may also be convolutions, say. Join layer X3 is a join of X1 and X2, say a concatenation, an addition, a subtraction, etc. In this example, the scaling factor for X1 and X2 must be equal because they are used in the Join operation, which means that layers U1 and U2 have the same scaling factor. Note that X1 and U1 have the same scaling factor, and X2 and U2 have the same scaling factor, because Gemm operations preserve the scaling factor. Thus, the two branches that culminate in the join operation have the same scaling factor which often is not ideal for the encoding of these values. Indeed, if, say, the output of Gemm_1, e.g., layer X1, happens to have a value that has a large, supported range, then this may cause a small scaling factor, which in turn would cause a small scaling factor on X2 as well since the encoding divisor is shared for the two branches. The fact that a small scaling factor will be imposed on the branch of U2 and X2 is not good for accuracy.

In a better setting, we would have two different scaling factors introduced at the output of PBS_1 and PBS_2. Such a system is solvable, by inserting a rescaling operation between Gemm_2 and the Join, e.g., as follows:

U1=PBS_1 ( ); U2=PBS_2 ( . . . );
X1=Gemm_1 (U1); X2=Gemm_2 (U2);
X2'=PBS_4 (X2)←inserted rescaling operation
X3=Join (X1, X2'); X4=PBS_3 (X3);

The rescaling allows Gemm_2 to be computed with a different scaling factor, e.g., a larger scaling factor. When the Gemm_2 computation is complete, the result may be scaled down to the smaller scaling factor of X1, by PBS_4, so that the Join operation receives equal scaling factors as expected. As a result, the accuracy of the Gemm_2 operation is improved. Now the scaling factor introduced on the output of PBS_1 and PBS_2 respectively can be different and selected to fit the following operations best.

A rescaling operation, from encoding divisor $d_1$ to another encoding with encoding divisor $d_2$, may be done as follows. Basically, one wants to apply the function $f(x)=x*d_1/d_2$. Call $l=d_1/d_2$. The function $f$ may be done by a new inserted PBS which transitions from one encoding to the other, in the general case and notably if $l$ is a rea number. Even better, if $l$ is an integer, or can be approximated to an integer, then the function $f$ can be done directly, natively, by a single multiplication by $l$ on the encrypted values, as integer multiplication is a natively supported operation.

Doing the function $f$ as a native multiplication is much more efficient. This is why one can change a bit the encoding divisors, such that they are still valid (i.e., give correct ranges of data in the second network, by following prescribed ranges) and such that $l$ is an integer. One may increase the encoding divisors $d_1$ a bit, such that $d_1/d_2$ is an integer: more precisely, we would replace $d_1$ by $d_1'$, for $d'=d_1+(-d_1 \bmod d_2)$, such that $d_1'/d_2$ is an integer. One may also approximate the rescaling factor $l$ by Round $(d_1/d_2)$ and check that the accuracy is reduced by a negligible factor, e.g., within a threshold. Using an integer is good in terms of performances since a multiplication is much faster than a PBS, but can be bad in terms of noise propagation if $l$ is not small.

Increasing $d_1$ a bit is especially advantageous if $d_2$ is small and $d_1$ is large, since it means that the increment $(-d_1 \bmod d_2)$ is small as compared to $d_1$. Deciding to replace a rescaling by an integer multiplication instead of a PBS may depend on an optimization flag or an optimization performed dynamically at the moment of the generation of the second network. For example, it may depend on whether one optimizes for execution time or accuracy. Accuracy could be determined by the accuracy unit 250.

For example, if we have d1=35.1 and d2=2, one may take d1'=36, such that d1'/d2=18 is an integer. Remark that d'1 is marginally larger than d1 (by 2.5% approximately), so it would be good for precision. In another example, we may have d1=25.2 and d2=17, we would take d1'=34, such that d1'/d2=2 is an integer: here, d'1 is really larger than d1 (by 34% approximately), so it would be bad for precision: a PBS might be preferred in this second case.

Inserting a rescaling is advantageous as it avoids that encodings need to be equal, and so avoids having encodings shared for many layers which shrink the options for encodings and can lead to too inaccurate solutions. Doing the rescaling with integer multiplication is more efficient but may reduce the accuracy or precision. Doing the rescaling with a PBS operator makes the second computational network slower to execute but is better for accuracy and precision.

In an embodiment the encodings and adjustment are done automatically by a computer. In an embodiment, equations are determined involving the encodings, such that they can be solved to find appropriate parameters. This improves the accuracy of the neural network as it avoids using too large encoding divisors. Using independent encoding divisors for different encodings and layers allows choosing encoding divisors that are locally best. Conventionally, in the art, all encoding divisors are made equal, sometimes implicitly so. This makes it impossible to address large and complex networks such as Resnet or VGG, while these can be addressed with an embodiment.

An embodiment of a converting method comprises assigning symbolic scaling factor to layers between operations, deriving conditions on the symbolic scaling factors from the first network architecture, reducing the number of symbolic scaling factors using the derived conditions.

For example, in case of a join layer the encoding divisors of the two or more layers at the input of the join operator preferably have equal encoding divisors. Once the encoding divisors are established, actual values can be assigned to them by comparing the supported ranges to the prescribed ranges.

In an embodiment, a provided dataset is used to compute values $\delta_i$: that is the size of the largest range of a value in a layer. The dataset is typically provided by a user. The dataset is a typical set of inputs for the neural network. Note that sizes can be evaluated on the first computational network, e.g., neural network.

using the dataset, one can compute the typical ranges $\delta_i$ of values appearing when executing the NN. The size of the range of a value is the difference between the maximum and minimum for that value. Alternatively, this information may not be recovered from a dataset, but directly provided by the user, e.g., if the dataset is a trade secret that one prefers not to share.

from the minimal values in layers, one can deduce encoding shifts, to make the values positive when needed, e.g., before PBS's advantageously, we can increase encoding divisors a bit, to let room for noise that needs to be added in TFHE schemes for security reasons.

When one does not use the dataset, one has to take care of the worst case scenario, and thus overestimate the values for encoding divisors, which at the end is bad for accuracy and may require larger FHE parameters, which in turn make the second computational network much slower. For example, an embodiment may comprise analyzing the network: determine what encoding of the different layers are needed, without yet assigning values to encoding divisors or shifts, solving the encodings: solve the system of equation, e.g., find which encodings are equal, and reduce the number of independent encodings. For example, one may assign an encoding to each value, with the condition that join operations are homogenous, that is have the same encoding divisor (or equivalently scaling factor) for all their inputs. For layers, all values in the same layer get the same scaling factor. For join operations, all values in all input layers get the same scaling factor. Linear operations (like matrix operations) preserve the scaling factor, so layers before and after a matrix operation also get the same scaling factor. Or, said differently, most of the operations which are not done with PBS, preserve encoding divisors. Depending on the network topology, this solving phase thus significantly reduces the number of encoding divisors.

measure layer ranges and $\delta$'s (in the first neural network): determining observed ranges in the original NN, such that it can be determined how to shrink ranges for these layers.

For example, one may compute $\delta_i$'s, which are maximal sizes of ranges in layer i in the original network. This is typically done by running the original network on a dataset given by the user, which corresponds to typical samples that can be treated by the NN. Then, for all layers $L_i$, we keep maximal $\max_{i,j}$ and minimal $\min_{i,j}$ values per neuron $N_{i,j}$ where j is the neuron index in the layer $L_i$, and then we compute $\delta_i = \text{Maximum}_{over\ j}(\{\max_{i,j} - \min_{i,j}\})$, e.g., the maximal value of the ranges of neurons of layer $L_i$. A layer can be regarded as a tensor of computed values sometimes called neurons; operation on layers may then be regarded as operations on these individual neurons.

Some operations may use a different formula, although the principle is the same. For example, if one were to replace a MaxPool by operations done with PBS. Inputs of the MaxPool done with a PBS must be in a range which is a subrange of $[0, \varepsilon'[$—for a certain $\varepsilon'$, which may be $\varepsilon'=\frac{1}{4}$. Furthermore, as MaxPool implies a comparison between values, the neurons can be shifted, but they should be shifted by the same shift to preserve the comparison. Thus, the shift may be equalized for all values in a layer in case the data is used as an input of a MaxPool. As the shift is the same for all neurons coming to a MaxPool, the $\delta_i$ may be computed differently as well. For example, such $\delta_i$ may be computed as:

$$\delta_i = \text{Maximum}_{over\ j}(\{\max_{i,j}\}) - \text{Minimum}_{over\ j}(\{\min_{i,j}\})$$

This will allow to shift by the same scalar, and at the same time, have a range which is included in $[0, \varepsilon'$ [as expected. Applying the shift may be done by inserting an adding layer, or modifying a previously operation to automatically apply this additive factor. For example, if the previous operation is a matrix operation, the matrix addition part (also called the bias) may be modified to apply the shift on all the neurons of the layer. For example, if the previous operation is a series of PBS operations, then the output encoding of the PBS may be adjusted so that values have the same shift.

find prescribed layer ranges: for all layers, find in what range the encoded values need to be; for some layers (e.g., inputs of convolutions), this can just limit the size for the range (like, any range whose size is smaller than 1); for more specific layers, e.g., inputs of activations, this can be a specific range, like $[0, \varepsilon[$ or $[0, \varepsilon'[$, for a certain $\varepsilon$ or $\varepsilon'$ For example, in an embodiment an encoded value needs to be in a range of size 1 or smaller, PBS input layers need to be in a subrange of $[0, \varepsilon[$; typically $\varepsilon=\frac{1}{2}$ any layer being the input of a MaxPool done with PBS needs to be in a subrange of $[0, \varepsilon'[$, for a certain $\varepsilon'$—typically half of $\varepsilon$ any other layer needs to be in a range of size smaller than 1 encoded output needs to be in a subrange of $[0,1[$

Thus, by running through all layers, we can get prescribed range size $r_i$ for every layer $L_i$, which is the largest size of a range that is supported by the subsequent operation.

deduce constraints: for every layer, knowing its symbolic encoding and its expected layer range, deduce some constraints on the encoding divisor of the symbolic encoding. At the end, the encoding divisor of any encoding is the maximal value of its constraints.

For example, in an embodiment start by constraints $c_j=0$ for all encodings $E_j$ for all layer $L_i$, knowing that the layer $L_i$ must be in a range smaller than $r_i$, that the layer in the original network has a delta $\delta_i$, and that the layer is in encoding $E_j$: set $c_j=\max(c_j, \delta_i/r_i)$.

Alternatively, another definition of $c_j$ is: $c_j$ is the maximal value of $\delta_i/r_i$ taken for all i such that layer $L_i$ has encoding $E_j$.

At the end, set $c_j$ as the encoding divisors of Encoding $E_j$, for all j's, or equivalently $a_j=1/c_j$ as the scaling factor.

deduce shifts: for layers which need to have a specific range (instead of just a size for the range), deduce encoding shifts. Some layers need to be made positive, e.g., inputs of activations, and to add shifts by the expected $s_i$, such that the equation holds. Most of the time, the shift is per-neuron, e.g., per value, e.g., the shift for the different neurons of a layer is not the same. For some special operations, the shift may be made the same for all values (neurons) in a layer. Moreover, there are cases where we want to group the shifts in order to reduce the number of PBS test vectors and so, of the footprint of the homomorphic program.

deduce PBS: as everything is now specified, the PBSs can be completely described

Example of FIG. 4a

Consider again the example of FIG. 4a. In this example, the solving gives that there is no equality between encodings, they are all independent (mainly because there is no Join operation in this very simple example). At the end, one will have encoding divisors: $d_0=\max(\delta_{input_1}, \delta_1, 2\delta_2)$ and $d_1=\delta_3$. Shift is only applied on layer 2, so that the PBS can run on positive values. And so, at the end, encoding $E_0$ (used for all layers but 3) is with encoding divisor $d_0$ and $E_1$ (used only in layer 3) is with encoding divisor $d_1$. The PBS which replaces activation ReLu2 will be: Activation $(x)=\text{ReLu}((x-s_0)*d_0)/d_1+s_1$.

Example of FIG. 4b

In this example, there is a Join operation: Add operation 422. To have a homogenous Join operation, the encodings of layer 16 and 17 should be the same. The output of the Join operation (layer 18) will have the same encoding as well. As Conv preserves encodings, this causes layers 15, 13 and 14 to have the same encoding divisor as layers 16, 17 and 18. Assuming no rescaling function is inserted, e.g., an integer multiplication or an additional PBS, see elsewhere herein, it turns out that all the layers have the same encoding divisor. Two different prescribed ranges occur in FIG. 4b, a range of size ½ for layer 14 and 18, since they are the respective inputs of PBS ReLu_14 and ReLu_18, and a range of size 1 for all the other layers. Accordingly, the network of FIG. 4b imposes $d_0 = \max(\delta_{13}, 2\delta_{14}, \delta_{15}, \delta_{16}, \delta_{17}, 2\delta_{18})$ which will be used as the encoding divisor of the unique encoding. ReLu_14 may be implemented with a PBS:

$$\text{Activation}(x) = \frac{ReLU((x - s_0) * d_0)}{d_0} + s_1$$

and the same applies for ReLu_18. In this example, the network architecture causes that the same encoding divisor $d_0$ is used as the input as at the output of the ReLu_14; this is not necessary, as we have seen previously that it is possible to change the encoding divisor at the PBS time, when useful. The shifts $s_0$ and $s_1$ may be per value, which means that there are as many test vectors for ReLu_14 as there are values in layer 14. The input shifts $s_0$ depend on how the values of the first computation network in layer 14 are represented in the second computation network. The input shifts can be determined, e.g., by parsing the network and tracking the values from the input through the network, while keeping track of the shifts. The output shifts $s_1$ in ReLu_14 are optional, they may be chosen as 0. Changing the shift of the encoding may be done in the previous operation, i.e., in the bias of Conv_13. In ReLu_18 it preferred that the inputs are positive, e.g., in the range from 0 to ½. The shift can simply be applied by inserting an extra addition (with the shift) between Add_17 and ReLu_18. Another more intricated solution (but faster) is to not have an extra addition, but directly change the bias Conv_15 or Conv_16.

Remark that in the figure, we do not have information about how ReLu_12 is computed. Without knowing the encoding of layer 12, one cannot define the PBS for ReLu_12. Similarly, we do not know how ReLu_18 is used.

As pointed out herein, making the supported range a bit larger than the observed ranges has several advantages. It decreases the chance of an out of range problem for values. It is also beneficial for security as more noise can be added to values. An unexpected advantage of having slightly larger supported ranges is that it gives more freedom of choice for the shifts. This in turn can be used to reduce the number of PBS test vectors that are needed to implement a further operation. Consider that a further operation may be implemented with a sequence of PBS values. Here as many PBS test vectors (which are the arrays or lookup tables used during the PBS operation) are needed as there are different encodings in a layer. As the encodings are chosen so that the scaling factors are equal for a given layer, this means that it is the number of different shifts that determine how many test vectors are needed. Without taking special consideration this will generally mean that there are as many PBS test vectors as there are values (or neurons in the case of neural network) in the layer.

The number of different test vectors can become dramatically too large when we have millions of values, like in big networks like Resnet of VGG or others.

However, instead of having all individual shifts, one may pack shifts into bins, which regroups shifts which are almost equal. Then, for values in the same bin, we force the shift to be the same. For example, the value may be the average of the shifts of the mean, or the median value of the shifts of the bin. Then, all the values in the same bin can then use the same test vector. So, for each value, one finally has:

an index i, corresponding to the index of the bin in which the value is; the index is between 0 and s−1, where s is the number of desired test vectors.

the PBS is thus done by using the i-th test vector of the layer; remark that i is different per value (or neuron in a neural network)

At the end, instead of having thousands or millions of test vectors for a given layer for very large networks, one only uses s test vectors, where s can be quite small, such as 128 or less. The larger s, the more accurate the network, but also the most expensive the test vectors are, in term of storage notably. So, finding the best s is a matter of tradeoff.

In an embodiment, system 200 comprises a group unit 260. The grouping unit is configured to determine the shifts in a layer which are to be inputs of a PBS layer. Each test vector of the PBS layer is adjusted for the particular shift of the value. Grouping unit 260 is configured for grouping the programmable bootstrapping operations implementing the further operation according to the individual shifts, replacing the programmable bootstrapping operations in a group with a single programmable bootstrapping operation reducing the number of test vectors, adjust the shift of the input of the programmable bootstrapping to the unique shift of the groups.

For example, let us suppose we have a layer followed by a PBS. Suppose the largest supported range size in a layer is 10, and that the prescribed range size for the layer is, say, 0.5, then the scaling factor for that layer may be 0.5/10=0.05. This scaling factor will be used for all values in the layer. Suppose a first value in the layer happens to have the largest supported range size and runs, say from 10 to 20, and that second value in the layer has a supported range from 11 to 21. After scaling, the range of the first value becomes 0.5 to 1, so that the encoding function of the first value becomes 0.05 x-0.5. After scaling, the range of the second value becomes 0.55 to 1.05, so that the encoding function of the first value becomes 0.05 x-0.55. It means that we have to have two different test vectors for the PBS following this layer. If we generalize to all the values in the layer (instead of simply 2), it is not unlikely that all of the values in the layer have a shift and so a different encoding function and thus would need a different test vector for the PBS.

In an embodiment, the number of PBSs that are needed is reduced. In this example, it is shown the number of PBS can be reduced by using same test vector for the first and second values.

By decreasing the prescribed range or increasing the supported range, a choice in shift becomes possible. For example, setting the prescribed range to 0.4, the scaling factor becomes 0.4/10=0.04. The range of the first value from 10 to 20 of the value above scales to the range 0.4 to 0.8. The range of the second value from 11 to 21 of the value above scales to the range 0.44 to 0.84.

Thus, we can apply the same encoding 0.04x-0.40 to the two values: it will give a range from 0 to 0.4 for the first value, and a range from 0.04 to 0.44 for the second value, both of which are acceptable since included in the prescribed range [0, 0.5[ expected by a PBS. Thus, the same test vector can be used for both values, since a single shift was used for them; note that the encoding divisors were already equal, since values are in the same layer.

Remark that the very same test vector could have been used for any value which has a supported range of size 10 or less included in [ƒ0, ƒ1], where ƒ0 and ƒ1 are real numbers, with $f0=10$ and $f1=20+(0.5-0.4)/0.04=22.5$, i.e., for any value which has a supported range included in [10, 22.5[ and of size 10 or less.

The shift that is to be applied to the values in the layer before a PBS can be applied in a dedicated operation, e.g., an extra add operation, though often applying the shift can be combined with a previous operation (e.g., in a bias of a previous Conv or Gemm).

The conversion system, e.g., system 114 and 200, may comprise a communication interface. The communication interfaces may be selected from various alternatives. For example, the interface may be a network interface to a local or wide area network, e.g., the Internet, a storage interface to an internal or external data storage, a keyboard, an application interface (API), etc. In particular, the communication interface may be configured to connect to a computer network. The communication interface may be used to receive a digital data set. The data set may comprise data items, e.g., parameters, values and the like indicating the first computation network and on which the conversion is to be performed by the system. The data may also include a sample set for evaluation of ranges or of accuracy parameters. The data may also include a desired level of accuracy. A data set for determining ranges may be the same as a data set to determine accuracy of a converted network.

A conversion system such as system 114 and/or 200 may have a user interface, which may include well-known elements such as one or more buttons, a keyboard, display, touch screen, etc. The user interface may be arranged for accommodating user interaction for configuring the systems, applying the system to new data, etc. Storage may be implemented as an electronic memory, say a flash memory, or magnetic memory, say hard disk or the like. Storage may comprise multiple discrete memories together making up the storage. Storage may comprise a temporary memory, say a RAM. The storage may be cloud storage.

The systems, e.g., system 114, and 200, may be implemented in a single device. Typically, the system comprises one or more microprocessors which execute appropriate software stored at the system; for example, that software may have been downloaded and/or stored in a corresponding memory, e.g., a volatile memory such as RAM or a non-volatile memory such as Flash. Alternatively, the systems may, in whole or in part, be implemented in programmable logic, e.g., as field-programmable gate array (FPGA). The systems may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, the systems may comprise circuits for the evaluation of cryptographic primitives.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 6:
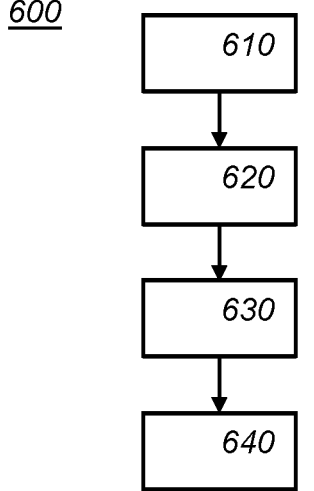

FIG. 6 schematically shows an example of an embodiment of a converting method 600 to convert a first computation network of operations into a second computation network of operations. The method may be computer-implemented. For example, a processor system may be configured for it. The operations of the second computation network are torus fully homomorphic encrypted (TFHE) operations, the operations in the first computation network comprising matrix operations (e.g., $y=Wx+B$) including an integral matrix multiplication and further operations (e.g., $z=A(y)$), converting the first computation network into the second computation network comprises converting the operations in the first network into corresponding TFHE operations in the second network, converting an operation in the first network comprises obtaining (610) for the input values of the operation a supported range of the input value in the first computation network, determining (620) a prescribed range for the input values of a corresponding TFHE operation, determining (630) a scaling factor ($1/d1$) between the size of the supported range of a value in the first computational network and the size of a scaled range of the value in the second computational network, wherein applying the scaling factor to each input value's supported range is at most the size of the prescribed range, adjusting (640) the operation to receive the input values scaled with the scaling factor.

The method may be applied to multiple operations as well. For example, in an embodiment the method comprises converting an operation in the first network comprises selecting multiple operations to receive a same scaling factor, obtaining for the input values of the multiple operations a supported range of the input value in the first computation network, determining multiple prescribed ranges for the multiple selected operations of corresponding TFHE operations, determining a scaling factor between the size of the supported range of a value in the first computational network and the size of a scaled range of the value in the second computational network, wherein applying the scaling factor to each input value's supported range of each of the multiple selected operations is at most the size of the prescribed range, For example, one could compute an individual scaling factor for each of the input value of each of the multiple selected operations, and the scaling factor may be selected as the minimum of the individual scaling factors, adjusting the one or more operations to receive the input values scaled with the scaling factor. For example, one may configure a processor system for this embodiment.

Many different ways of executing the method are possible, as will be apparent to a person skilled in the art. For example, the order of the steps can be performed in the shown order, but the order of the steps can vary or some steps may be executed in parallel. Moreover, between steps, other method steps may be inserted. The inserted steps may represent refinements of the method such as described herein, or may be unrelated to the method. For example, some steps may be executed, at least partially, in parallel. Moreover, a given step may not have finished completely before a next step is started.

Embodiments of the method may be executed using software, which comprises instructions for causing a processor system to perform method 600. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the devices, units and/or parts of at least one of the systems and/or products set forth.

Figure 7A:
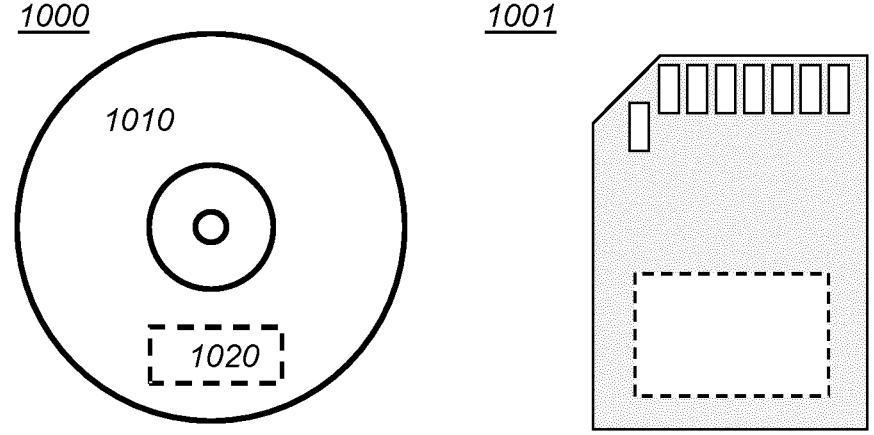

FIG. 7*a* shows a computer readable medium 1000 having a writable part 1010, and a computer readable medium 1001 also having a writable part. Computer readable medium 1000 is shown in the form of an optically readable medium. Computer readable medium 1001 is shown in the form of an electronic memory, in this case a memory card. Computer readable medium 1000 and 1001 may store data 1020 wherein the data may indicate instructions, which when executed by a processor system, cause a processor system to perform an embodiment of a conversion method, according to an embodiment. The computer program 1020 may be embodied on the computer readable medium 1000 as physical marks or by magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said conversion method. The computer readable medium may also or instead comprise the results of executing a method according to an embodiment, e.g., a second computational network.

Figure 7B:
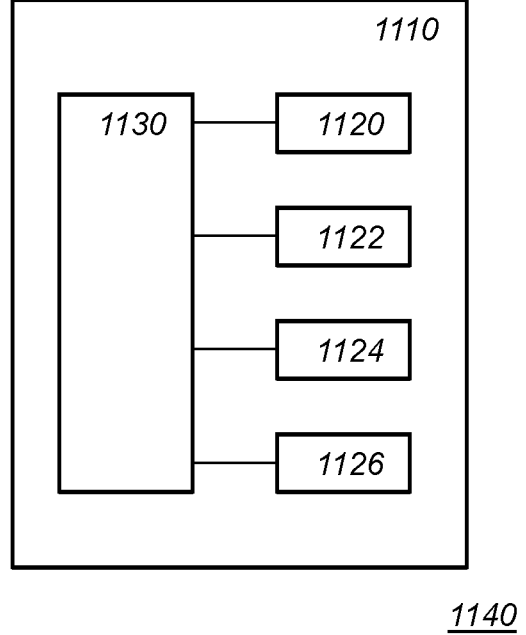

FIG. 7*b* shows in a schematic representation of a processor system 1140 according to an embodiment of an FHE device or system. The processor system comprises one or more integrated circuits 1110. The architecture of the one or more integrated circuits 1110 is schematically shown in FIG. 7*b*. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the FHE system or device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex MO. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

While device 1110 is shown as including one of each described component, the various components may be duplicated in various embodiments. For example, the processor 1120 may include multiple microprocessors that are configured to independently execute the methods described herein or are configured to perform steps or subroutines of the methods described herein such that the multiple processors cooperate to achieve the functionality described herein. Further, where the device 1110 is implemented in a cloud computing system, the various hardware components may belong to separate physical systems. For example, the processor 1120 may include a first processor in a first server and a second processor in a second server.

The following numbered clauses include embodiments that are contemplated and nonlimiting.

1. A computer-implemented method to convert a first computation network of operations into a second computation network of operations, the operations of the second computation network being fully homomorphic encrypted (FHE) operations, the operations in the first computation network comprising matrix operations (y=Wx+B) including an integral matrix multiplication and further operations (z=A(y)), converting the first computation network into the second computation network comprises converting the operations in the first network into corresponding FHE operations in the second network, converting an operation in the first network comprises obtaining for the input values of the operation a supported range of the input value in the first computation network, determining a prescribed range for the input values of a corresponding FHE operation, determining a scaling factor ($1/d_1$) between the size of the supported range of a value in the first computational network and the size of a scaled range of the value in the second computational network, wherein applying the scaling factor to each input value's supported range is at most the size of the prescribed range, adjusting the operation to receive the input values scaled with the scaling factor.

2. A converting method as in clause 1, wherein the first network is evaluated for a sample set of input values while monitoring the input values to obtain observed ranges, the supported ranges being derived from the observed ranges.

3. A system for converting a first computation network of operations into a second computation network of operations, the operations of the second computation network being fully homomorphic encrypted (FHE) operations, the operations in the first computation network comprising matrix operations (y=Wx+B) including an integral matrix multiplication and further operations (z=A(y)), converting the first computation network into the second computation network comprises converting the operations in the first network into corresponding FHE operations in the second network, the system comprising a communication interface for receiving the first computation network, a processor system configured for converting operation in the first network, converting an operation comprising obtaining for the input values of the operation a supported range of the input value in the first computation network, determining a prescribed range for the input values of a corresponding FHE operation, determining a scaling factor $(1/d_1)$ between the size of the supported range of a value in the first computational network and the size of a scaled range of the value in the second computational network, wherein applying the scaling factor to each input value's supported range is at most the size of the prescribed range, adjusting the operation to receive the input values scaled with the scaling factor.

It should be noted that the above-mentioned embodiments illustrate rather than limit the presently disclosed subject matter, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter may be implemented by hardware comprising several distinct elements, and by a suitably programmed computer. In the device claim enumerating several parts, several of these parts may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A computer-implemented converting method to convert a first computation network of operations into a second computation network of operations, the method comprising:

receiving a representation of the first computation network in a digital format, converting the first computation network of operations into the second computation network of operations, the operations of the second computation network being fully homomorphic encrypted (FHE) operations, the operations in the first computation network comprising matrix operations $(y=Wx+B)$ including an integral matrix multiplication and further operations $(z=A(y))$, converting the first computation network into the second computation network comprises converting the operations in the first computation network into corresponding FHE operations in the second computation network, wherein converting an operation in the first computation network comprises:

obtaining for the input values of the operation a supported range of the input value in the first computation network, wherein the first computation network is evaluated for a sample set of input values while monitoring the input values to obtain an observed range, the supported range being derived from the observed range, determining a prescribed range for the input values of a corresponding FHE operation, wherein the prescribed range ensures correct processing of the input values by the FHE operation, determining a scaling factor $(1/d_1)$ between the size of the supported range of a value in the first computation network and the size of a scaled range of the value in the second computation network, wherein applying the scaling factor to each input value's supported range is at most the size of the prescribed range, and adjusting the operation to receive the input values scaled with the scaling factor, transferring the second computation network to an FHE computing system through a communication interface, receiving encrypted data items from an external computer at the FHE computing system, performing fully homomorphic encrypted (FHE) operations at the FHE computing system according to the second computation network, and transmitting computation results to the external computer in an FHE encrypted format.

2. The converting method as in claim 1, wherein a matrix operation comprises a matrix multiplication and a matrix addition $(Wx+B)$, adjusting the matrix operation comprising adjusting the matrix addition $(B'=B/d_1)$ but not the matrix multiplication, to receive the input values scaled with the scaling factor $(x'=x/d_1)$.

3. The converting method as in claim 1, wherein a further operation $(A(x))$ is adjusted to receive the input values scaled with the scaling factor and shifted with a shift value $(A(d_1x-s_1))$.

4. The converting method as in claim 1, wherein a further operation $(A(x))$ in the first computation network comprises a function $(f(x_i))$ applied to each input value, the function being converted to multiple FHE operations adjusted for the same scaling factor and multiple different shift values $(f(d_1x-s_i))$.

5. The converting method as in claim 1, wherein the further operation $(A(x))$ is further adjusted to produce an output value scaled with a further scaling function for a next operation $(A(\ )/d_2; A(\ )/d_2+s_2)$.

6. The converting method as in claim 1, wherein the first and second computation network are neural networks.

7. The converting method as in claim 1, wherein the prescribed range for a further operation is from 0 inclusive up to a value $(\varepsilon)$ less than or equal to 1.

8. The converting method as in claim 1, wherein the prescribed range for a max-pool operation is half the size of the prescribed range of an activation function.

9. The converting method as in claim 1, wherein the supported range is computed from the larger observed range by applying a margin function to the observed range.

10. The converting method as in claim 1, wherein an operation in the first computation network receives input values from multiple earlier operations, the corresponding operation in the second computation network receiving input values from corresponding multiple earlier operations scaled with a scaling factor that is equal for all input values.

11. The converting method as in claim 10, wherein the operation in the first computation network that receives input values from multiple earlier operations is an addition, a subtraction, or a concatenation.

12. The converting method as in claim 1, wherein values in the second computational network are equal to the values in the first computation network to which a scaling function is applied, the scaling function $(x'=x/d+s)$ being defined by a scaling factor $(1/d)$ and a shifting addition $(s)$, values in the same layer having the same scaling factor.

13. The converting method as in claim 1, comprising:

assigning symbolic scaling factor to layers between operations, deriving conditions on the symbolic scaling factors from the first network architecture, and reducing the number of symbolic scaling factors using the derived conditions.

14. The converting method as in claim 12, comprising:

determining a shift value for an input value from a difference between the supported range after scaling and the prescribed range.

15. The converting method as in claim 13, comprising for remaining symbolic scaling factors corresponding to one or more layers in the second network, a scaling factor being associated to the symbolic scaling factor, wherein the scaling factor applied to the supported ranges in the corresponding one or more layers fit in the prescribed ranges of the corresponding one or more layers.

16. The converting method as in claim 1, comprising inserting a further operation in the second computational network between two operations corresponding to an operation in the first computation network to transition from one scaling factor to another scaling factor.

17. The converting method as in claim 16, wherein the further operation is an integer multiplication.

18. The converting method as in claim 1, wherein a further operation $(A(x))$ is implemented in the second computation network as multiple programmable bootstrapping operations having test vectors each adjusted for an individual shift value, the method further comprising:

grouping the test vectors implementing the further operation according to the individual shifts, replacing the test vectors in a group with a single programmable bootstrapping operation reducing the number of test vectors, and adjusting the shift of the input of the corresponding programmable bootstrapping to the shift of one of the groups.

19. The converting method as in claim 1, wherein the first computation network and the second computation network of operations are configured to take an image as input.

20. The converting method as in claim 1, wherein the further operation comprises one or more of: an activation function, a Relu function, sigmoid function, softmax function, softplus function, softsign function, tanh function, selu function, elu function, exponential function, LeakyReLU layer, PReLU layer, ThresholdedReLU layer.

21. A non-transitory computer readable medium comprising data representing any one of:

instructions, which when executed by a processor system, cause the processor system to perform the converting method according to claim 1, and data representing a second network obtained.

22. A system for converting a first computation network of operations into a second computation network of operations, the operations of the second computation network being fully homomorphic encrypted (FHE) operations, the operations in the first computation network comprising matrix operations $(y=Wx+B)$ including an integral matrix multiplication and further operations $(z=A(y))$, converting the first computation network into the second computation network comprises converting the operations in the first network into corresponding FHE operations in the second network, the system comprising:

a communication interface for receiving a representation of the first computation network in a digital format, a processor system configured for:

(i) converting the first computation network of operations into the second computation network of operations, converting the first computation network into the second computation network comprises converting the operations in the first computation network into corresponding FHE operations in the second computation network, wherein converting an operation comprises:

obtaining for the input values of the operation a supported range of the input value in the first computation network, wherein the first network is evaluated for a sample set of input values while monitoring the input values to obtain an observed range, the supported range being derived from the observed range, determining a prescribed range for the input values of a corresponding FHE operation, wherein the prescribed range ensures correct processing of the input values by the FHE operation, determining a scaling factor $(1/d_1)$ between the size of the supported range of a value in the first computational network and the size of a scaled range of the value in the second computational network, wherein applying the scaling factor to each input value's supported range is at most the size of the prescribed range, and adjusting the operation to receive the input values scaled with the scaling factor, (ii) transferring the second computation network to an FHE computing system through a communication interface, wherein the FHE computing system comprises a processor system configured for (iii) receiving encrypted data items from an external computer at the FHE computing system, (iv) performing fully homomorphic encrypted (FHE) operations at the FHE computing system according to the second computation network, and (v) transmitting computation results to the external computer in an FHE encrypted format.

* * * * *